(12) United States Patent
Rieger et al.

(10) Patent No.: US 12,556,572 B2
(45) Date of Patent: Feb. 17, 2026

(54) CYBER RESILIENT TRADE-OFF EVALUATION SYSTEMS FOR OPERATIONAL TECHNOLOGY ENVIRONMENTS, INCLUDING RELATED METHODS AND COMPUTER READABLE MEDIA

(71) Applicants: Battelle Energy Alliance, LLC, Idaho Falls, ID (US); University of Idaho, Moscow, ID (US)

(72) Inventors: Craig G. Rieger, Pocatello, ID (US); Konstantinos Kolias, Idaho Falls, ID (US); Robert Christopher Ivans, Ammon, ID (US)

(73) Assignees: Battelle Energy Alliance, LLC, Idaho Falls, ID (US); University of Idaho, Moscow, ID (US)

( * ) Notice: Subject to any disclaimer, the term of this patent is extended or adjusted under 35 U.S.C. 154(b) by 191 days.

(21) Appl. No.: 18/465,852

(22) Filed: Sep. 12, 2023

(65) Prior Publication Data
US 2024/0089284 A1    Mar. 14, 2024

Related U.S. Application Data

(60) Provisional application No. 63/375,374, filed on Sep. 12, 2022.

(51) Int. Cl.
*H04L 29/00* (2006.01)
*H04L 9/40* (2022.01)

(52) U.S. Cl.
CPC .............................. *H04L 63/1433* (2013.01)

(58) Field of Classification Search
CPC ...................... H04L 63/1433; H04L 63/1416
See application file for complete search history.

(56) References Cited

U.S. PATENT DOCUMENTS

| | | | |
|---|---|---|---|
| 7,096,498 B2* | 8/2006 | Judge | G06F 21/577 |
| | | | 726/25 |
| 9,571,519 B2* | 2/2017 | Adams | G06F 21/577 |

(Continued)

FOREIGN PATENT DOCUMENTS

WO    2023/064898 A1    4/2023

OTHER PUBLICATIONS

Aschermann et al., "Nautilus: Fishing for Deep Bugs with Grammars", Network and Distributed Systems Security (NDSS) Symposium 2019, Feb. 24-27, 2019, 15 pages.

(Continued)

*Primary Examiner* — Don G Zhao
(74) *Attorney, Agent, or Firm* — TraskBritt

(57) ABSTRACT

A system comprises one or more networks including a digital twin and one or more cyber system components. The digital twin is configured to emulate at least a portion of a physical system of an operational technology (OT) system. One or more processors of the system are configured to select a mitigative response measure to enable in the one or more networks for execution in response to a simulated cyber attack; determine a physical system reaction and a cyber system reaction responsive to the simulated cyber attack and the mitigative response measure; and determine a resilience level of an OT system enabled with the mitigative response measure responsive to the physical system reaction and the cyber system reaction.

23 Claims, 17 Drawing Sheets

(56) References Cited

U.S. PATENT DOCUMENTS

| | | | |
|---|---|---|---|
| 9,948,663 B1* | 4/2018 | Wang | H04L 63/1416 |
| 11,841,699 B2* | 12/2023 | Sayyarrodsari | G05B 19/41875 |
| 12,034,756 B2* | 7/2024 | Busany | H04L 63/1425 |
| 12,093,818 B2* | 9/2024 | Schmitt | G06N 3/08 |
| 12,120,146 B1* | 10/2024 | Shakhzadyan | H04L 63/1408 |
| 12,231,461 B2* | 2/2025 | Engelberg | H04L 63/1441 |
| 12,284,200 B2* | 4/2025 | Engelberg | G06N 5/04 |
| 12,328,335 B2* | 6/2025 | Kairali | H04L 63/1441 |
| 12,355,798 B2* | 7/2025 | Engelberg | G06F 21/577 |
| 2014/0259095 A1 | 9/2014 | Bryant | |
| 2019/0379681 A1* | 12/2019 | Murphy | G06N 7/01 |
| 2020/0133257 A1* | 4/2020 | Cella | G05B 19/4183 |
| 2020/0175171 A1 | 6/2020 | Rieger et al. | |
| 2020/0225655 A1* | 7/2020 | Cella | G06F 18/2178 |
| 2020/0310394 A1* | 10/2020 | Wouhaybi | H04L 67/1051 |
| 2020/0348662 A1* | 11/2020 | Cella | G05B 19/41865 |
| 2021/0081270 A1* | 3/2021 | Abbaszadeh | G06F 18/295 |
| 2021/0084056 A1* | 3/2021 | Abbaszadeh | H04L 9/0858 |
| 2021/0089661 A1 | 3/2021 | Rieger et al. | |
| 2021/0110262 A1* | 4/2021 | Schmitt | G06N 3/045 |
| 2021/0250370 A1* | 8/2021 | Inokuchi | G06F 21/577 |
| 2022/0014423 A1* | 1/2022 | Smith | H04L 43/08 |
| 2022/0036302 A1* | 2/2022 | Cella | H04L 67/1097 |
| 2022/0100182 A1* | 3/2022 | Mehrotra | G05B 19/41885 |
| 2022/0269417 A1* | 8/2022 | Sanvido | G06F 3/0608 |
| 2022/0291666 A1* | 9/2022 | Cella | G06F 18/241 |
| 2022/0334929 A1* | 10/2022 | Potyraj | G06F 3/067 |
| 2022/0358097 A1* | 11/2022 | Lee | G06F 16/1834 |
| 2023/0021214 A1 | 1/2023 | Lehmer et al. | |
| 2023/0101742 A1 | 3/2023 | Rieger et al. | |
| 2023/0153316 A1* | 5/2023 | Almadi | G06F 16/27 707/722 |
| 2023/0153646 A1* | 5/2023 | Ploennigs | G06N 5/022 706/48 |
| 2023/0237404 A1* | 7/2023 | Jayathirtha | G06Q 10/06393 705/7.28 |
| 2023/0306154 A1* | 9/2023 | Khandelwal | G06F 30/20 |
| 2023/0421615 A1* | 12/2023 | Visoky | G06F 8/65 |
| 2024/0015178 A1* | 1/2024 | Yarabolu | H04L 63/145 |
| 2024/0411896 A1* | 12/2024 | Myers | G06F 21/552 |
| 2025/0068743 A1* | 2/2025 | Rahman | G06F 21/552 |
| 2025/0141908 A1* | 5/2025 | Alam | H04L 63/1433 |

OTHER PUBLICATIONS

Aschermann et al., "Redqueen: Fuzzing with Input-to-State Correspondence", , Network and Distributed Systems Security (NDSS) Symposium 2019, Feb. 24-27, 2019, 15 pages.

Cai et al., "MagicFuzzer: Scalable Deadlock Detection for Large-Scale Applications", 2012 34th International Conference on Software Engineering (ICSE), Zurich, Switzerland, 2012, 11 pages.

Chen et al., "Active Fuzzing for Testing and Securing Cyber-Physical Systems", Singapore Management University, (2020) ISSTA '20: Proceedings of the 29th ACM SIGSOFT International Symposium on Software Testing and Analysis, Jul. 18-22, 2020, 14 pages.

Gan et al., "CollAFL: Path Sensitive Fuzzing", 2018 IEEE Symposium on Security and Privacy (SP), 2018, 18 pages.

Jia et al., "Adversarial Attacks and Mitigation for Anomaly Detectors of Cyber-Physical Systems", International Journal of Critical Infrastructure Protection, May 2021, 15 pages.

Kholidy, "Autonomous Mitigation of Cyber Risks in the Cyber-Physical Systems", Future Generation Computer Systems, vol. 115, Feb. 2021, 9 pages.

Lemieux et al., "FairFuzz: A Targeted Mutation Strategy for Increasing Greybox Fuzz Testing Coverage", ASE '18, Sep. 3-7, 2018, Montpellier, France, 11 pages.

Phillips et al., "An Operational Resilience Metric for Modern Power Distribution Systems", 2020 IEEE 20th International Conference on Software Quality, Reliability and Security Companion, 2020, 9 pages.

Rieger et al., "A Cyber Resilient Design for Control Systems", 2020 Resilience Week (RWS), 2020, 8 pages.

Rieger et al., "Resilient Control Systems—Basis, Benchmarking and Benefit", IEEE Access, vol. 9, 2021, 13 pages.

Rieger et al., "Resilient Control Systems: Next Generation Design Research", 2009 2nd Conference on Human System Interactions (HSI), May 21-23, 2009, 6 pages.

Rieger, "Resilient Control Systems Practical Metrics Basis for Defining Mission Impact", 2014 7th International Symposium on Resilient Control Systems (ISRCS), Aug. 2014, 12 pages.

Somorovsky, "Systematic Fuzzing and Testing of TLS Libraries", CCS '16: Proceedings of the 2016 ACM SIGSAC Conference on Computer and Communications Security, Oct. 24-28, 2016, 13 pages.

* cited by examiner

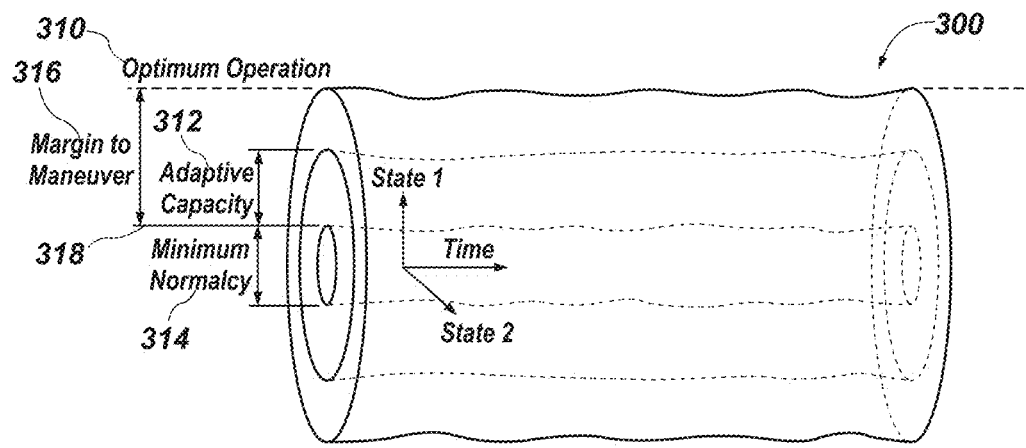
Normal Operation
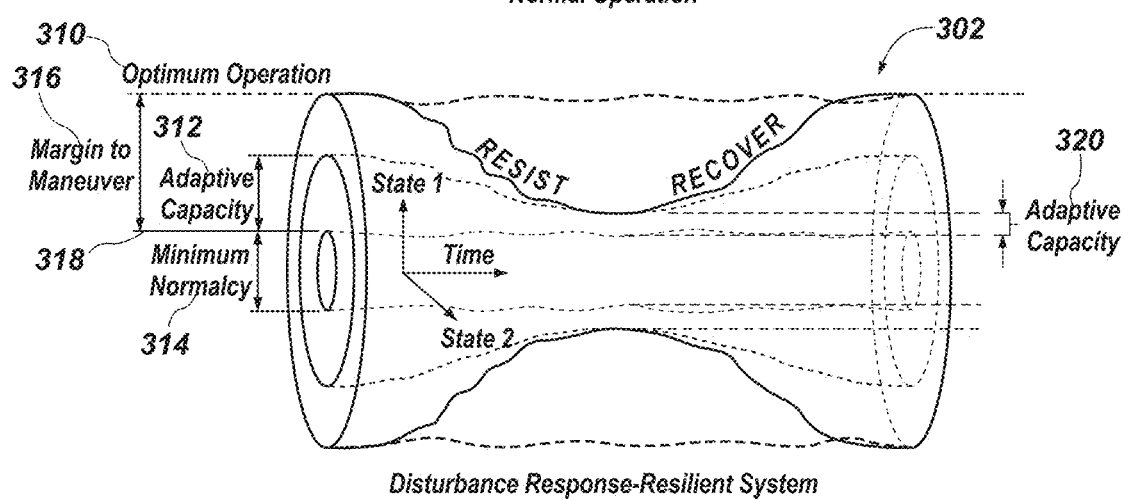
Disturbance Response-Resilient System
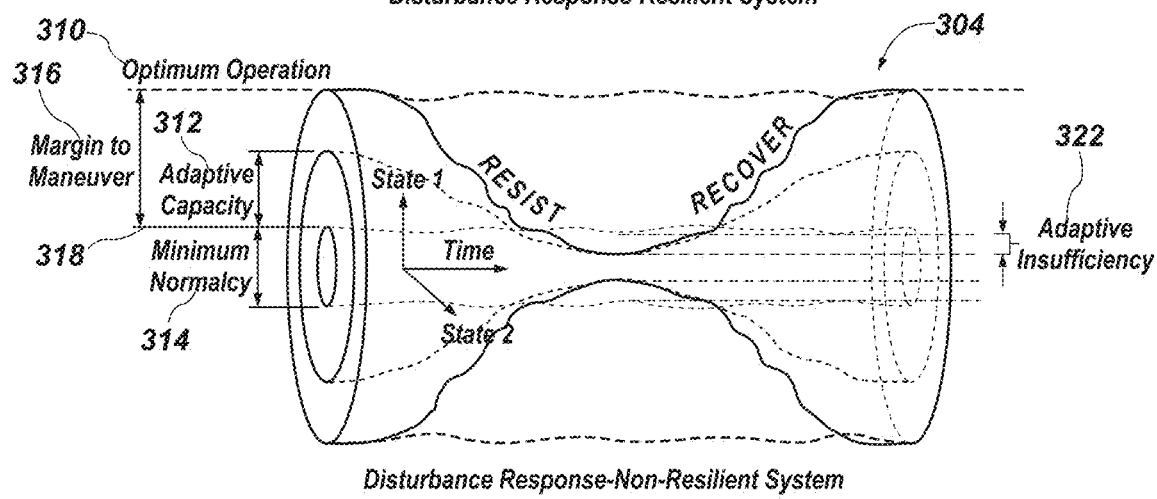
Disturbance Response-Non-Resilient System
FIG. 3

Candidate Mitigative Response Measures

| Attack | Attack Taxonomy | Possible Target | Network Impact | Cyber Response | Cyber Mitigative Benefit (Greater Mitigation=Better) | Physical System Impact (Less Impact=Better) | Physical Response | Physical Mitigative Benefit (Greater Mitigation= Better) |
|---|---|---|---|---|---|---|---|---|
| Active Network Scanning/ Enumeration | Protocol Based | Controller, HMI, Servers, Switches, Routers | Increases network traffic latency | 1. Block scanning ARP/IP/TCP session using SDN 2. MTD 3. Return false results 4. Set up a honeypot/ honeynet | 1. Stops scan, warns attacker of detection 2. Provides attacker with inaccurate results, makes targeting difficult 3. Can aid in detection of further attacks if falsified data is detected in the future 4. Prevents additional targeting of active devices, aids in attribution | None if the blocking doesn't affect ICS communications | None Needed | N/A |
| Passive Network Scan/Enumeration | Protocol Based | All Network Devices | No Effect | None | None | None | None Needed | N/A |
| Buffer Overflow | Protocol Based | Controller, HMI, Servers | Shutdown controller or HMI Remote code Execution | 1. MTD 2. Drop packets from SDN using DPI 3. Drop packets with unknown MAC/IP at SDN 4. Startup secondary controller using SDN | 1. Prevents targeting of end device 2. Drop packets of death before effecting controller 3. Drops packets of unknown senders 4. Continues service after standing up second controller | Would impact affected ICS controller, and interruption until this is affected | Switch to an isolated, preferably diverse backup | Switch to a backup that is not vulnerable to the same attack. If only redundancy is possible, then a cyber block and a redundant switch can return normal conditions |
| XSS Scripting/markup Injection | Protocol Based | HMI Servers | Remotely execute unauthorized control commands | 1. Block incoming packets by source address using SDN 2. MTD | 1. Stops individual attacks 2. Makes targeting of web apps difficult (HMI could be a web app) | Would prevent monitoring and control, and depend on whether an OPC server has redundancy, or for a common exploit, all were compromised | Response through switching to an isolated HMI required | A secondary, diverse HMI would be a good solution to maintain monitoring |

Protocol-Based Attacks

FIG. 5A

Candidate Mitigative Response Measures — 500B

| Attack | Attack Taxonomy | Possible Target | Network Impact | Cyber Response | Cyber Mitigative Benefit (Greater Mitigation=Better) | Physical System Impact (Less Impact=Better) | Physical Response | Physical Mitigative Benefit (Greater Mitigation=Better) |
|---|---|---|---|---|---|---|---|---|
| SSH/Account Compromise | Traffic Based | HMI, Controller, Servers, Switches, Routers | Prevent remote management of devices | 1. Block source IP using SDN 2. Deactivate account 3. MTD | 1. Stops brute force attack 2. Prevents attack on device, aids in attribution 3. Prevents exploitation of that device 4. Prevents targeting of SSH/Account service | May not affect an ICS item unless the mode compromised is an ICS device through compromised account. Telnet like communications not normally real time activity, but more for set points | None, unless compromised, and specific attack response discussed below according to affect | N/A |
| DNP3 Flood | Traffic Based | HMI, Controller | Breaks control feedback loop | Block incoming packets by source address using SDN | Blocks attackers access to send packets on network | Mitigation should help recover the system and not create new problems | Depending upon packets being read by HMI or controller and affects, data should be flagged by distributed analytics and corrected | Data flagged as malicious to the operator and dropped before control action |
| Denial of Service (DoS) | Traffic Based | HMI, Controller, Routers, Servers, Switches | Breaks control feedback loop Halts routing and switching to multiple devices | 1. MTD 2. Block incoming packets by source address using SDN 3. Redirect traffic to virtual network 4. Disable system processes if coming from known host | 1. Prevents targeting of end devices 2. Blocks attackers access to send packets on network 3. Allows attack to continue a non-critical network 4. Stops attack from insider threat or compromised device | Mitigation may generally save the system but rerouting the traffic will cause potential loss of monitoring or response, i.e., inability to send new set points or controller responses out of date due to bad data | Cyber response should provide primary response, but a redundant system in place could be brought to bear | Redundant system that is not impacted by DoS takes over to maintain operation |

Traffic-Based Attacks

FIG. 5B

Candidate
Mitigative Response Measures

| Attack | Attack Taxonomy | Possible Target | Network Impact | Cyber Response | Cyber Mitigative Benefit (Greater Mitigation=Better) | Physical System Impact (Less Impact=Better) | Physical Response | Physical Mitigative Benefit (Greater Mitigation= Better) |
|---|---|---|---|---|---|---|---|---|
| DNP3/Modbus replay attack | Header Based | HMI Controller | Control loop is compromised; old control values resent | 1. Place controller and HMI on new network segment using SDN 2. Detect and block physical port of attacker using SDN 3. MTD | 1. Restores the control loop 2. Removes man in the middle 3. Prevents attacker from targeting control loop | Mitigation will resolve potentially instable or degrading operation based upon bad data. The scale of the ancillary affects would depend on what is blocked to know good ICS devices | Depending upon packets being read by HMI or controller and affects, data should be flagged by analytics and corrected | Data flagged as malicious to the operator and dropped before control action |
| DNP3/Modbus integrity attack | Header Based | HMI Controller | Control loop is compromised; false control values resent | 1. Place controller and HMI on new network segment using SDN 2. Detect and block physical port of attacker using SDN 3. MTD | 1. Restore the control loop 2. Removes man in the middle 3. Prevents attacker from targeting control loop | Mitigation removes compromised data, which could be acted upon, but may have ancillary affects and would require an assurance that any controller, logic or HMI that uses it is placed in a good state. This good state could still be a degraded state | Corrections is the logic recognized through distributed analytics recognition and response or switching to an isolated controller of HMI required | The switch to an isolated and preferably diverse controller or HMI with full or subset capability maintains operations |

Header-Based Attacks

FIG. 5C

CYBER RESILIENT TRADE-OFF EVALUATION SYSTEMS FOR OPERATIONAL TECHNOLOGY ENVIRONMENTS, INCLUDING RELATED METHODS AND COMPUTER READABLE MEDIA

CROSS-REFERENCE TO RELATED APPLICATIONS

This application claims the benefit under 35 U.S.C. § 119(e) of U.S. Provisional Patent Application Ser. No. 63/375,374, filed Sep. 12, 2022, the disclosure of which is hereby incorporated herein in its entirety by this reference.

STATEMENT REGARDING FEDERALLY SPONSORED RESEARCH OR DEVELOPMENT

This invention was made with government support under contract No. DE-AC07-05-ID14517 awarded by the United States Department of Energy. The government has certain rights in the invention.

TECHNICAL FIELD

This disclosure relates generally to cyber resilient systems for operational technology (OT) environments that include physical systems, and more particularly, to systems for identifying optimal mitigative response measures to cyber attacks in OT environments including physical systems, as well as to related methods and computer readable media.

BACKGROUND

Operational technology (OT) systems operate to control physical systems (e.g., power grid systems, water treatment systems, and so on) that provide critical infrastructural needs to society. OT systems may be susceptible to cyber attacks but are designed to maintain some level of resiliency when responding to and mitigating the cyber attacks. Physical system processes may be impacted during a response and mitigation of the cyber attacks.

BRIEF SUMMARY

In one illustrative example, a system comprises one or more networks including a digital twin and one or more cyber system components. The digital twin is configured to emulate at least a portion of a physical system of an operational technology (OT) system. One or more processors of the system are configured to select a mitigative response measure to enable in the one or more networks for execution in response to a simulated cyber attack; determine a physical system reaction and a cyber system reaction responsive to the simulated cyber attack and the mitigative response measure; and determine a resilience level of an OT system configured with the mitigative response measure responsive to the physical system reaction and the cyber system reaction.

In another illustrative example, a method of identifying one or more optimal mitigative response measures to an anticipated cyber attack on an OT system is provided. The method comprises selecting a mitigative response measure for execution in response to a simulated cyber attack in one or more networks, the one or more networks including a digital twin and one or more cyber system components, the digital twin configured to emulate at least a portion of a physical system of the OT system; obtaining one or more physical system reaction indications at least partially based on a reaction output from the digital twin, the reaction output from the digital twin being at least partially responsive to the simulated cyber attack and the mitigative response measure; obtaining one or more cyber system reaction indications at least partially based on a reaction output caused by the one or more cyber system components, the reaction output caused by the one or more cyber system components being at least partially responsive to the simulated cyber attack and the mitigative response measure; and determining a resilience level of an OT system enabled with the mitigative response measure at least partially based on the one or more physical system reaction indications and the one or more cyber system reaction indications.

In yet another illustrative example, at least one non-transitory computer-readable medium comprising computer-executable instructions, which when executed by one or more processors, cause the one or more processors to perform operations comprising obtaining a set of candidate mitigative response measures to an anticipated cyber attack on an operational technology (OT) system associated with a physical system; facilitating a test procedure for respective ones of the candidate mitigative response measures, the test procedure comprising selecting a respective one of the candidate mitigative response measures for execution in response to a simulated cyber attack in one or more networks, and determining an OT system resilience level associated with the candidate mitigative response measure at least partially based on a reaction output in the one or more networks responsive to the simulated cyber attack and the candidate mitigative response measure.

In one or more examples, the computer-executable instructions cause the one or more processors to perform operations at least partially based on a genetics or evolutionary based algorithm. In one or more examples, respective ones of the candidate mitigative response measures include a selected one or combination of multiple mitigative response components, and further include, for respective ones of the multiple mitigative response components, a selected one of multiple configurations thereof, multiple settings thereof, and/or multiple parameters thereof. Here, in one or more examples of the genetics or evolutionary based algorithm, the operations comprise selecting a subset of optimal candidate mitigative response measures at least partially based on a ranking of respective ones of the candidate mitigative response measures from the test procedure, the ranking being at least partially based on determined OT system resilience levels associated with the candidate mitigative response measures; generating an updated set of updated candidate mitigative response measures based on at least some of the optimal candidate mitigative response measures from the subset, the updated set of updated candidate mitigative response measures including the at least some of the optimal candidate mitigative response measures adapted with modifications to and/or variations on respective selected ones or combinations of multiple mitigative response components and/or respective selected ones of multiple configurations thereof, multiple settings thereof, and/or multiple parameters thereof; and repeating the performing of the test procedure for the updated set, the selecting of the subset of optimal candidate mitigative response measures, and the generating of the updated set of updated candidate mitigative response measures, one or more times as needed for identifying one or more optimal mitigative response measures for the OT system associated with the physical system.

BRIEF DESCRIPTION OF THE SEVERAL VIEWS OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

FIG. 3 depicts three-dimensional resilience evaluation curves associated with operation of respective OT systems, according to one or more examples.

FIGS. 5A, 5B, and 5C show respective tables that provide an informational framework for considering various cyber and physical responses to different types of cyber attack types with different attack taxonomies, according to one or more examples.

DETAILED DESCRIPTION

Figure 1:
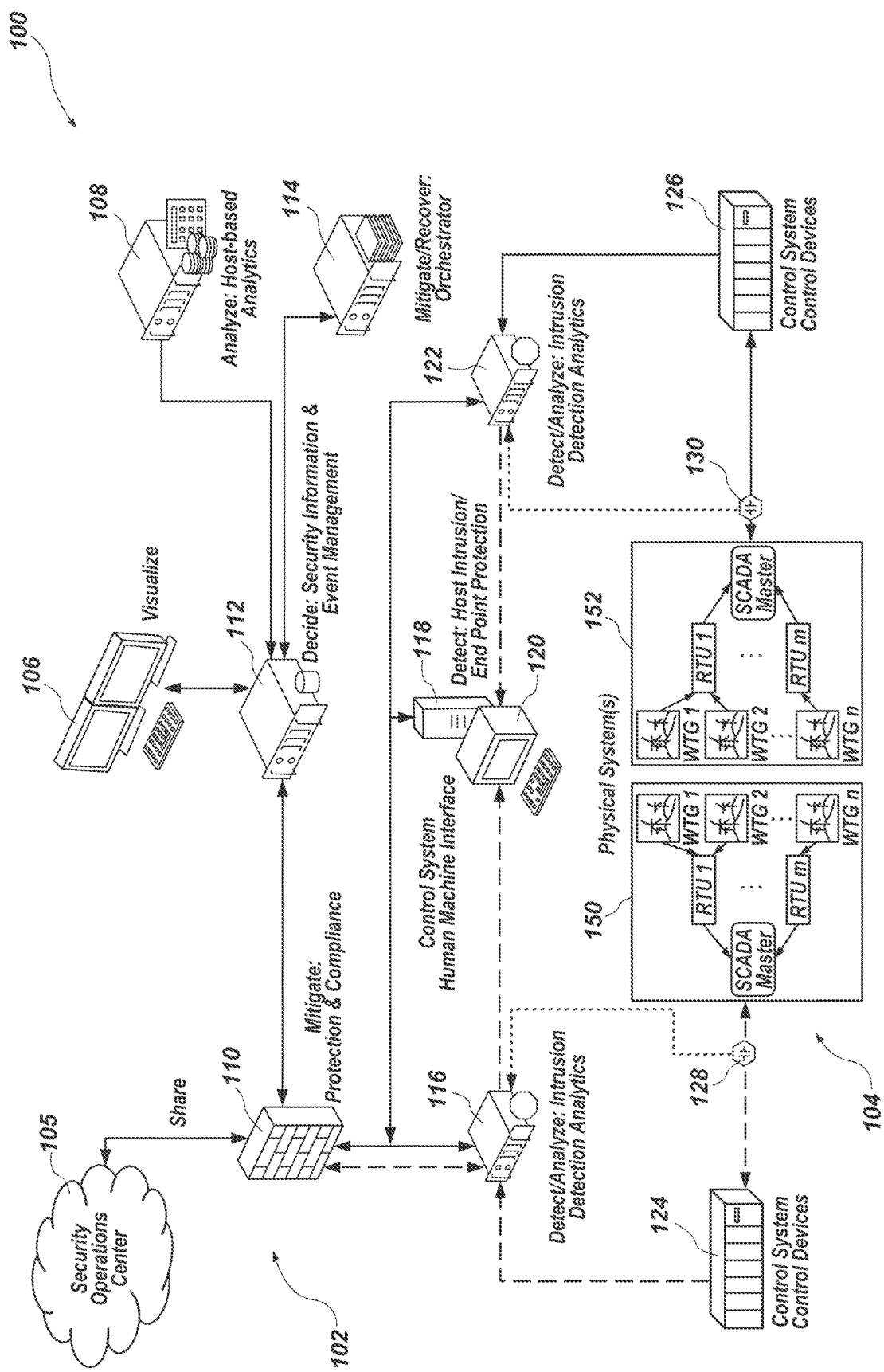
FIG. 1 is a block diagram of a network architecture comprising one or more networks connected to an operational technology (OT) system, according to one or more examples.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

One or more examples herein may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "resilience" refers to operation of a system at or above a threshold minimum level of normalcy despite occurrence (e.g., normal occurrence) of disturbances or adversarial activity. This threshold minimum level of normalcy may also be referred to herein as the "resilience threshold." To achieve resilience, phases of response should be strategically planned and outlined. Holistic performance of the system maintains a recognition and response level that is above the resilience threshold.

Evaluating automated and autonomous responses to cyber attacks is helpful to advance suitable response strategies and reduce reaction time to the same. To help enable such evaluation in an Operational Technology (OT) environment including a physical system, it is helpful to have an understanding of the physical system effects that are spawned from modifying network behavior. One way to achieve this, at least to some extent, is by adopting design strategies that characterize the dynamic interaction of set points and data for proper operation of the OT system. This is particularly helpful where the dependencies are associated with the dynamics of feedback control.

According to one or more examples, systems, methods, and computer readable media for evaluating OT cyber-resilience architectures to enable the proper application of automated and autonomous mitigations to cyber attacks are disclosed. Evaluation of candidate mitigative response measures to (e.g., simulated) cyber attacks may reveal one or more trade-off situations for analysis. On the one hand, remediating actions may mitigate the impact of cyber attacks. On the other hand, such actions may threaten system stability and compromise the deterministic nature of the OT system. In one or more examples, the evaluation and/or trade-off analysis includes a process for considering both cyber and physical mitigations to an attack and for determining/confirming whether a desired level of resilience of the system is maintained. In one or more examples, time dynamics and data dependencies may be considered in the process. The trade-off analysis provides a framework for enumerating the types of mitigative response measures that are acceptable in order to achieve a desired level of cyber-resilience.

Efforts in the field of cyber security response have been largely centralized. In one or examples, techniques and/or components of the present disclosure may be distributed and built upon prior considerations for cyber resilience using multi-agent architectures. In this context, while practical metrics have been defined in the past, the ability to adapt to what may be unexpected failures may be helpful for assessing system resilience.

In one or more examples, a unique variation of an OT systemic "fuzzer" is introduced as a means to evaluate resilience to proposed cyber and physical mitigations to cyber attacks. This variation on the fuzzer, referred to as a "buzzer," is used not merely as a means to discover exploitable cyber-vulnerabilities. Rather, the buzzer is configured to test proposed combinations of (e.g., the best) possible mitigative response measures, and/or variations of the same, for identifying and/or confirming (e.g., proper) system response, and for ultimately determining one or more mitigative response measures associated with a suitable system resilience (e.g., an optimal system resilience).

In one or more examples, the buzzer is configured to discover and/or identify one or more optimal mitigative response measures to an anticipated cyber attack on at OT system at least partially based on a genetics or evolutionary based algorithm.

In general, a genetic or evolutionary based algorithm may apply the principles of the theory of evolution to discover (e.g., more efficiently) one or more optimal solutions to a real problem that has a very large number of possible solutions. A genetic or evolutionary based algorithm may be considered to be a non-deterministic methodology, in which different candidate solutions to a problem are yielded on different test runs, often with use of at least some random sampling in the discovery of (e.g., better) candidate solutions. During the discovery of solutions, the algorithm typically maintains a population of candidate solutions, where one or more of the candidate solutions are considered to be the current "best" solution(s) and the remaining candidate solutions are sample points in other regions of the search space to assist in the subsequent discovery of even better solution(s).

There are many possible approaches to, and variations on, such an algorithm. For example, in a genetic algorithm, the problem is typically encoded in a series of bit strings that are manipulated by the algorithm; in an evolutionary algorithm, decision variables and problem functions may be operated on directly. In one or more examples, the algorithm may repeatedly make random changes or "mutations" in one or more candidate solutions, thereby yielding new candidate solutions that are better or sometimes worse than existing candidate solutions. In one or more examples, the algorithm may also involve crossover operations where elements of existing candidate solutions are combined (e.g., from each "parent") to create new, better solutions.

FIG. 1 is a block diagram of a network architecture 100 comprising one or more networks 102 connected to an operational technology (OT) system 104, according to one or more examples. OT system 104 may be associated with one or more physical systems and one or more control systems to control the respective physical systems. In FIG. 1, for example, OT system 104 is shown to include two physical systems: a physical system 150 connected to and controlled by a control system 124 having multiple control devices, and a physical system 152 connected to and controlled by a control system 126 having multiple control devices. Operations of the physical system(s) and control system(s) may be assisted through use of a human machine interface (HMI) 120 connected in one or more networks 102.

In one or more examples of FIG. 1, each physical system 150 and 152 is a wind turbine system for generating electricity. Here, each physical system 150 and 152 includes multiple wind turbine generators (WTGs) (e.g., WTG 1, WTG 2, . . . , WTG n), remote terminal units (RTUs) (e.g., RTU 1, RTU 2, . . . , RTU n), and a supervisory control and data acquisition (SCADA) master or supervisory system. A SCADA master includes various components including one or more servers and software for gathering incoming data and sending control commands to field-connected devices.

Network architecture 100 provides an integration of an information technology (IT) system configured with cyber security and OT system 104 configured with control of one or more physical systems 150, 152. Thus, network architecture 100 may include multiple network components to facilitate communication and control associated with operation of OT system 104. Network architecture 100 may also include cyber system components of a cyber system to facilitate cyber security protection over OT system 104.

Cyber system components of FIG. 1 may include components to detect, analyze, decide/visualize, mitigate/recover, and/or share. These components are illustrated in FIG. 1 as individual or single components, or alternatively, as components combined with other components. One or more components to detect 118 are configured for monitoring and detecting network traffic to recognize anomalies and undesirable traffic (e.g., including host intrusion/end point protection). One or more components to analyze 108 are configured for acquiring details regarding the nature and gaining insight in the execution methodology of an attack (e.g., including host-based analytics). In one or more examples, the one or more components to analyze 108 may include machine learning (ML) methods. One or more components to detect and analyze 116, 122 are configured with combined functionality of detection and analysis (e.g., including intrusion detection analytics). One or more components to detect and analyze 116, 122 are connected to control systems 124, 126 and to one or more monitoring/ sensing/detecting interfaces 128, 130 on communication links between control systems 124, 126 and their respective physical systems 150, 152. One or more components to decide/visualize 112, 106 are configured for presenting information to cyber-defenders for quick recognition and response (e.g., including security information and event management). One or more components to mitigate/recover 110, 114 are configured for stopping a cyber attack and (substantially) reversing any negative effects (e.g., including protection and compliance, orchestration, and so on). One or more components to share (e.g., with one or more networks 105 of a security operations center) are configured with a set of tools for providing detailed information associated with a detected cyber attack. This information may be shared in a secure manner, for example, in order to benefit the defenses of other organizations.

Additional foundational security considerations may be considered and implemented in network architecture 100 in FIG. 1. In one or more examples, the additional security considerations include segmentation of traffic and isolation (e.g., using Software-Defined Networking (SDN)). Such trade-off options provide the basis for application of active network adaptations for cyber security, such as with SDN, and active physical adaptations, such as by switching to a backup, a known good device, and/or a known secure device corrections to mitigate undesirable cyber attacks, such as parameter offsets from data injection.

As is apparent, network architecture 100 provides a foundation on which cyber-physical responses may be built upon in order to provide an increased level of cyber security. A proper understanding of the factors of timing and data may also be helpful for recognizing traffic patterns and resulting metrics.

Figure 2:
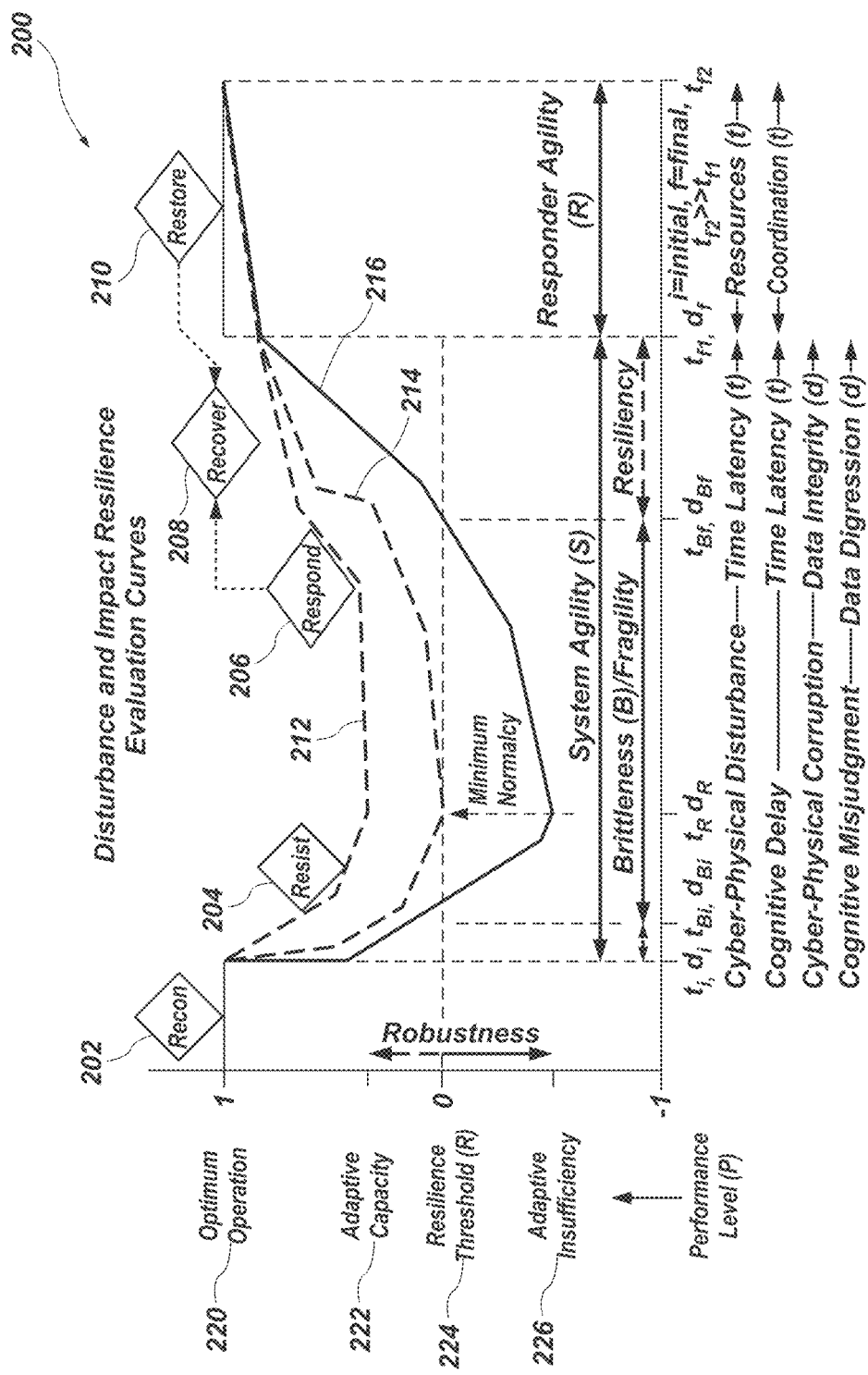
FIG. 2 is a graph depicting disturbance and impact resilience evaluation curves associated with operation of respective OT systems having different levels of resilience, according to one or more examples.

FIG. 2 is a graph 200 depicting disturbance and impact resilience evaluation curves 212, 214, and 216 associated with operation of respective OT systems having different levels of resilience, according to one or more examples. When evaluating considerations for a cyber-physical response that may impact the stable operation of an OT system, it may help to factor in aspects relating to both timing and data. The impact on a system with respect to both timing and data is illustrated in FIG. 2.

In general, the resilience of a system may be determined by its response to a disturbance (e.g., a cyber attack) to the system. Five factors, known as the "five Rs of Resilience," may influence a resilience threshold 224 of a system. As indicated in FIG. 2, the five factors include a factor of reconnaissance ("Recon") 202, a factor to resist 204, a factor to respond 206, a factor to recover 208, and a factor to restore 210. The factor of reconnaissance 202 may include maintaining proactive state awareness of system conditions and degradation. The factor to resist 204 may include a system response to recognized conditions, both to mitigate and counter. The factor to respond 206 may include stopping system degradation and returning to normal system performance. The factor to restore 210 may include longer term performance restoration (e.g., equipment replacement). The factor to recover 208 may include considering the additive respond and restore actions.

Various levels of resilience/non-resilience are indicated: a level of optimum operation 220, a level of adaptive capacity 222, and a level of adaptive insufficiency 226. The resilience of a system may be understood by its ability to initially reduce the impact of a disturbance (e.g., the factor to resist 204) and recover from it in both the short-term (e.g., the factor to respond 206) and long-term (e.g., the factor to restore 210).

In FIG. 2, resilience evaluation curve 216 has a trajectory associated with an example system that is not sufficiently resilient and falls below some predefined normalcy criterion during the disturbance (e.g., reaching the level of adaptive insufficiency 226). Resilience evaluation curves 212 and 214 are associated with example systems that maintain a minimum level of acceptable operation during the disturbance, indicating resilient as opposed to fragile or brittle systems. More particularly, resilience evaluation curve 214 is associated with an example system that (minimally) satisfies a minimum normalcy, while resilience evaluation curve 212 is associated with an example system that is more satisfactory and exhibits the level of adaptive capacity 222.

FIG. 3 depicts three-dimensional resilience evaluation curves associated with operation of respective OT systems, according to one or more examples. More particularly, a resilience evaluation curve 300 (i.e., the topmost curve) reflects performance of a system during normal operation (e.g., no disturbance); a resilience evaluation curve 302 (i.e., the middle curve) reflects performance of a resilient system in response to a disturbance; and a resilience evaluation curve 304 (i.e., the bottommost curve) reflects performance of a non-resilient system in response to the disturbance.

In FIG. 3, various levels and margins of resilience/non-resilience are indicated: a level of optimum operation 310, a margin to maneuver 316 above a resilience level 318, a margin of adaptive capacity 312 above the resilience level 318, and a margin of minimum normalcy 314 below the resilience level 318. Resilience evaluation curve 300 reflects performance at the level of optimum operation 310 during normal operation (e.g., no disturbance). Resilience evaluation curve 302 of the resilient system indicates a small margin of adaptive capacity 320 within the margin of adaptive capacity 312 during the disturbance. Resilience evaluation curve 304 of the non-resilient system indicates a margin of adaptive insufficiency 322 within the margin of minimum normalcy 314 during the disturbance.

Again, the network architecture 100 of FIG. 1 is a foundation on which cyber-physical responses may be built upon in order to provide an increased level of cyber security. A proper understanding of the factors of timing and data may also be helpful for recognizing traffic patterns and resulting metrics.

To establish the proper context that is needed for evaluating the trade-off space for analysis, a decomposition of timing and data considerations defined in terms of OT functionality is provided. Timing issues typically involve considerations associated with latency. Data issues typically involve the types of physical parameters for monitoring and control that are shared on the OT system. While many roles may be considered for human monitoring and response (e.g., roles associated with an instrument technician and operator), one or more examples of the disclosure focus on humans operating the OT system.

A simple taxonomy of time and data considerations associated with a physical system is provided below, where the term "plant" relates to various physical processes (e.g., power plant, chemical plant, and so on):

Plant Physical Data
   Human Monitoring
      Raw Analog Plant Information
      Raw Digital Plant Information
      System State
      Raw Data Analytics
   Human Plant Response
      Plant Controller Set Points
      Plant Hand Switch Positions
      Plant Tuning Parameters
   System State
      OT Device Health Status
      OT Network Health Status
Time
   Loss of Determinism
   Packet Not Delivered Note that the specific focus of the above categories is the pertinent information used in OT operation, not necessarily in communications semantics.

The taxonomy of timing and data for a cyber system may be considered in similar fashion to that of the physical system. While cyber system communications might be on a separate network from the physical network, this taxonomy provides insights into the considerations that may be considered in the trade-off analysis design to establish operations of the communications pathways. The human roles may be different from the physical, and include cyber defenders and analysts.

A simple taxonomy of time and data considerations associated with a cyber system is provided below.

Cyber Data
   Human (Cyber Defender) Monitoring
      Raw Log Information
      Raw IDS Information
      System State
      Raw Data Analytics
   Human (Cyber Defender) Control Response
      Software-Defined Network (SDN) Controller Set Points
      Security Appliance Parameters
   Security System Health State
      Security System Device Status
      Security System Network Status
Time
   Latency of Packet Delivery
   Packet Not Delivered With consideration of the physical data and cyber data taxonomies, the appropriate hardware/software components in network architecture 100 of FIG. 1 may be configured. Detection, analysis, and response mechanisms may form at least part of the cyber-physical feedback loops in data/message flows. The trade-off analysis design may be further considered in terms of cyber attack types and potential cyber-physical responses.

Figure 4A:
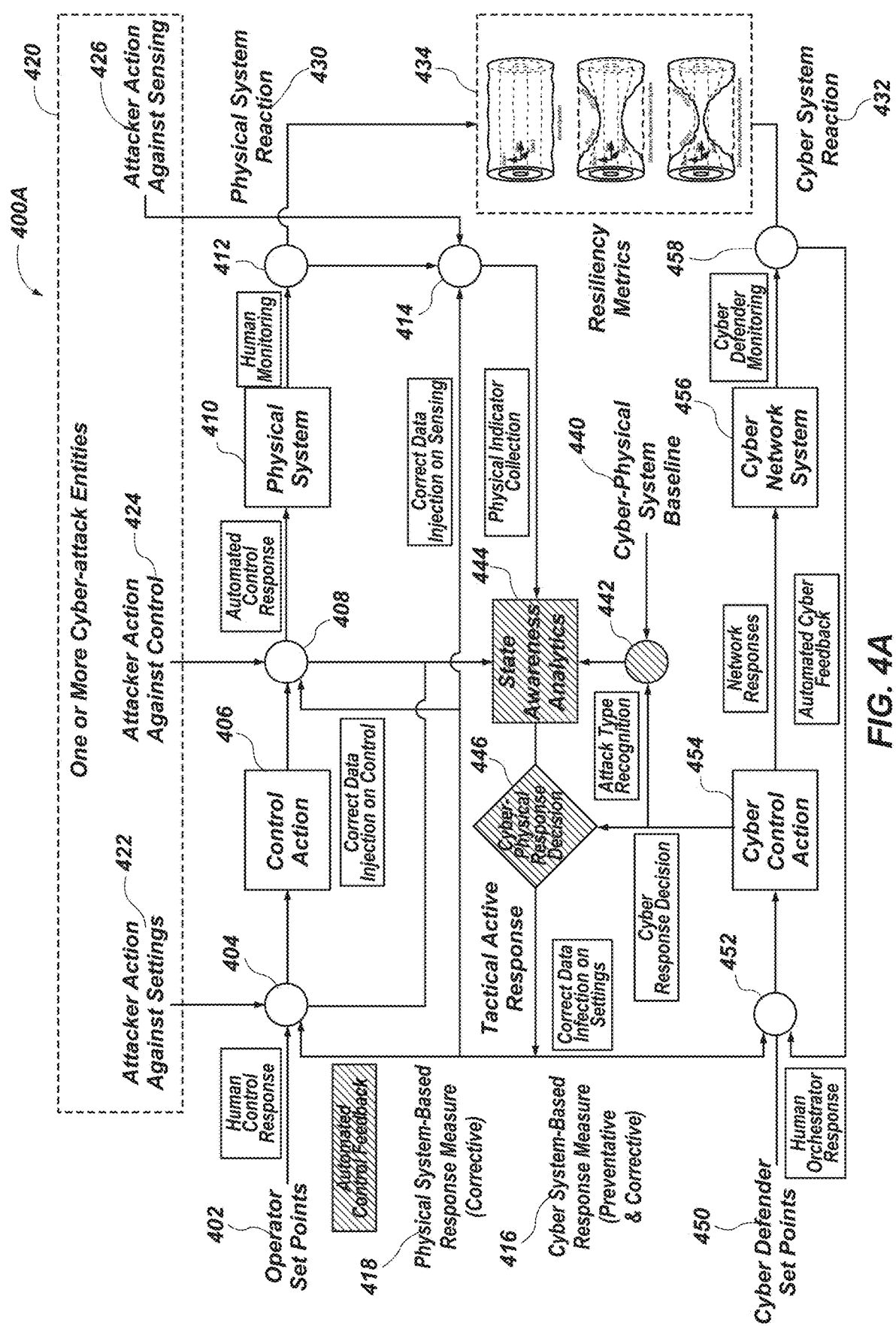
FIG. 4A is a flow diagram of a data/message flow in a system for mitigating cyber attacks in real-time, according to one or more examples.

FIG. 4A is a flow diagram 400A of a data/message flow in a system for mitigating cyber attacks in real-time, according to one or more examples. Flow diagram 400A of the data/message flow includes a cyber-physical feedback loop for automated feedback control. The system may be configured for identifying one or more optimal mitigative response measures to an anticipated cyber attack on an OT system which includes a physical system 410, according to one or more examples.

Operator set points 402 are communicated via a node 404 for use in a control action module 406. An output of control action module 406 is communicated via a node 408 to control the physical system 410. A reaction output from physical system 410 may be observed via a node 412 as one or more physical system reaction indications 430. The one or more physical system reaction indications 430 may also be received and processed by one or more processors configured to generate resiliency metrics 434 for analysis.

One or more cyber attack entities 420 may employ one or more (simulated) cyber attack actions that may adversely affect stable operation of physical system 410. An attacker action 422 against settings may be inserted via node 404 to manipulate the operator set points. An attacker action 424 against control may be inserted via node 408 to manipulate the output to control physical system 410. An attacker action 426 against sensing may be inserted via node 414 to manipulate the sensing of physical system 410.

Mitigative response measures to a cyber attack action may include a cyber system-based response measure 416, a physical system-based response measure 418, or both. In a system configured to control a cyber/network system 456, cyber defender set points 450 are communicated via a node 452 for use in a cyber control action module 454. An output from cyber control action module 454 is communicated to control cyber/network system 456. A reaction output from cyber/network system 456 may be observed via a node 458 as one or more cyber system reaction indications 432. The one or more cyber system reaction indications 432 may be received and processed by the one or more processors, together with the one or more physical system reaction indications 430, for generating resiliency metrics 434 for analysis.

In one or more examples, cyber corrections may include SDN and firewall changes that isolate/redirect expected malicious communications. The cyber corrections may complement existing analytics of recognition that are informed by intrusion detection system(s) (IDS s), both commercial and those advanced from research. In one or more examples, physical corrections may include filtering and/or offsetting malicious changes to return to normal. The cyber and physical system reactions provide the basis for interpreting the benefit of the mitigation, as well as the cost of the mitigation, all of which may be confirmed by metrics on resilience.

Again, the data/message flow includes a cyber-physical feedback loop for automated feedback control. A state awareness analytics module 444 may obtain the operator set points via node 404, the output from control action module 406 via node 408, and the one or more physical system reaction indications 430 via a node 414. State awareness analytics module 444 may also receive, via a node 442, cyber-physical baseline data 440 and attack type recognition from cyber control action 454. State awareness analytics module 444 may generate an output based on these inputs. A cyber-physical response decision 446 may be generated based on the output from state awareness analytics module 444 and the output from cyber control action module 454. An output from cyber-physical response decision 446 may be provided to nodes 404, 408, 414, and 452 for automated feedback control.

The resilience of the communications design depends on the ability to maintain both monitoring and control for process operation and security alert recognition and response. From the standpoint of the physical corrections, it should be noted that the communications pathways should be maintained so that corrections may be implemented on OT devices, such as a process controller. For cyber corrections, communications may generally be on a separate security management network, but the communications should be designed well. That is, distribution of the recognition and response may help establish a continued cyber resilience in the contested space.

Figure 4B:
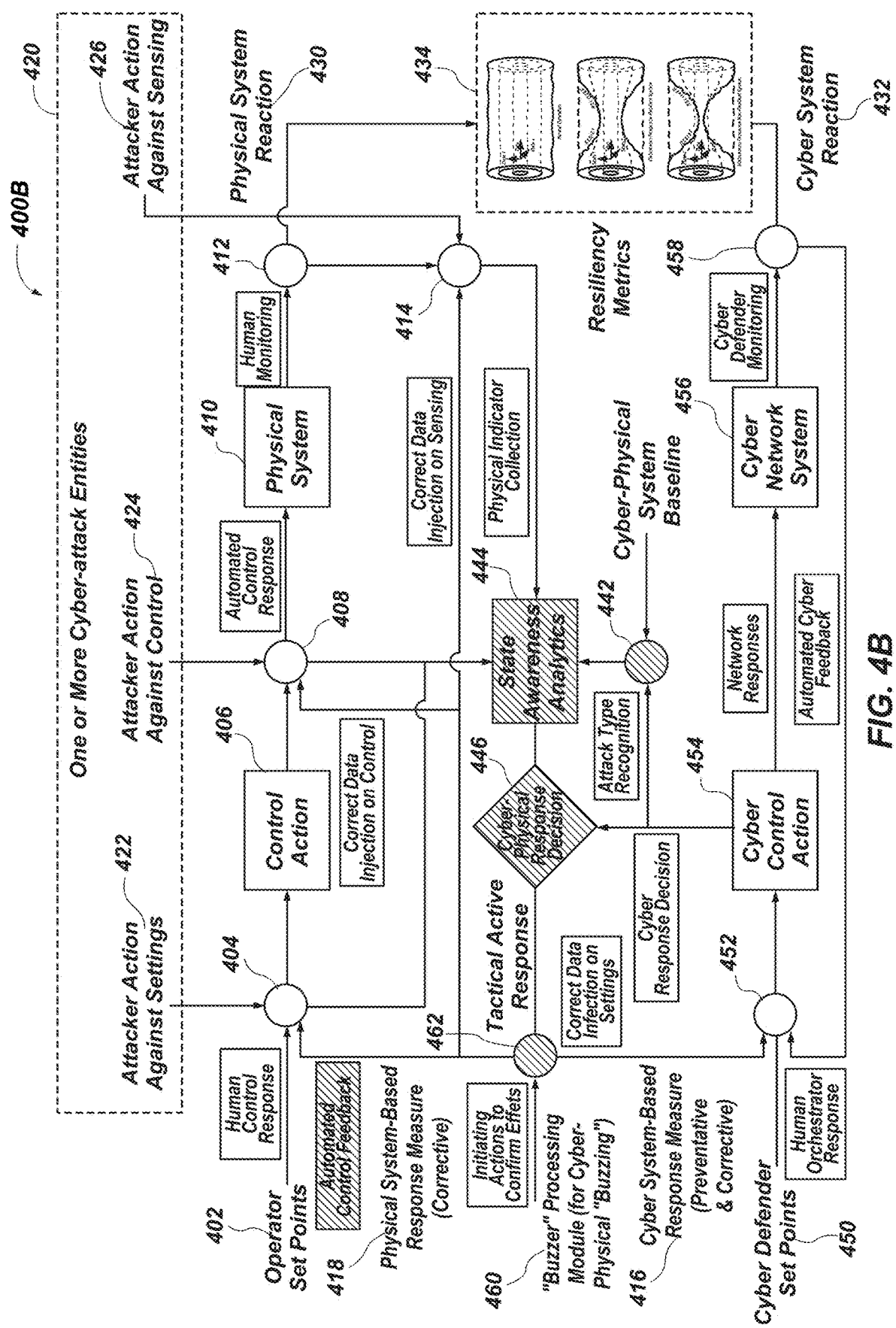
FIG. 4B is a flow diagram of a data/message flow in a system for mitigating cyber attacks in real-time, where the system employs a digital twin configured to emulate at least a portion of a physical system of the OT system, and a "buzzer" processing module for buzzer module processing, according to one or more examples.

FIG. 4B is a flow diagram 400B of a data/message flow in a system for mitigating cyber attacks in real-time, according to one or more examples Like flow diagram 400A of FIG. 4A, flow diagram 400B of FIG. 4B includes a cyber-physical feedback loop for automated feedback control. The system may be configured for identifying one or more optimal mitigative response measures to an anticipated cyber attack on an OT system, according to one or more examples. The data/message flow of FIG. 4B is substantially the same as the system of FIG. 4A, except that the physical system is replaced with a digital twin 410 configured to emulate at least a portion of the physical system. Even further, the system of FIG. 4B includes a processing module 460 via a node 462 configured to perform one or more techniques, e.g., a "buzzer" processing module for cyber-physical "buzzing" techniques, according to one or more examples.

In some applications, a conventional fuzzer is used to add formality to a test procedure for stressing a system to confirm response calls. A conventional fuzzer is generally used to identify vulnerabilities in a system with a security implication. On the other hand, the cyber-physical feedback loop of FIG. 4B reveals an application for evaluating the impact to physical system operation as a result of implementing specific mitigative response measures to cyber attacks.

Accordingly, in one or more examples, a parallel variation on the fuzzer, referred to herein as a "buzzer," may be configured for use in a system or method of the present disclosure. In one or more examples, a buzzer processing module (i.e., processing module 460) is configured to evaluate some, most, or all potential cyber-physical responses and provide confirmation/rejection of stable operation of an OT system including its coupled "plant" response. In one or more examples, buzzer processing utilizes genetic or evolutionary algorithms for the discovery of (the most) optimal resilient systems. Buzzer processing is described in more detail below, especially in relation to FIGS. 6, 9, and 10A-10B.

FIGS. 5A, 5B, and 5C show respective tables 500A, 500B, and 500C that provide an informational framework for considering various cyber system-based response measures and/or physical system-based response measures to different types of cyber attack types with different attack taxonomies, according to one or more examples. It is noted that tables 500A, 500B, and 500C are shown to merely provide non-exhaustive, non-limiting examples, which may or may not be used as one (example) starting list of possible mitigative response measures. In these tables 500A, 500B, and 500C, ARP refers to Address Resolution Protocol (ARP), IP refers to Internet Protocol (IP), MAC refers to Media Access Control (MAC), ICS refers to Industrial Control System (ICS), and OPC refers to Open Platform Communications (OPC), SDN refers to Software-Defined Network (SDN), DPI refers to Deep Packet Inspection (DPI), SSH refers to Secure Shell (SSH), DoS refers to Denial-of-Service (DoS), and DNP3 refers to Distributed Network Protocol 3 (DNP3), and XSS refers to Cross-Site Scripting (XSS).

More particularly, table 500A of FIG. 5A is associated with example cyber attack types that are protocol-based. The example cyber attack types in table 500A of FIG. 5A include an active network scanning/enumeration; a passive network scanning/enumeration; a buffer overflow; and a XSS/markup injection. Table 500B of FIG. 5B is associated with example cyber attacks types that are traffic-based. The example cyber attack types in table 500B of FIG. 5B include a SSH/account compromise; a DNP3 flood; and a DoS attack. Table 500C of FIG. 5C is associated with example cyber attack types that are header-based. The example cyber attack types in table 500C of FIG. 5C include a DNP3/Modbus replay attack; and a DNP3/Modbus integrity attack.

In tables 500A, 500B, and 500C, one or more suggested mitigative response measures are indicated in relation to each cyber attack type, as one or more non-limiting examples. Each mitigative response measure ("candidate mitigative response measures") may include one or more cyber system-based response measures, one or more physical system-based response measures, or a combination thereof. As indicated, multiple types of cyber system-based response measures and/or physical system-based response measures may be considered in association with each cyber attack type. For example, the (possible) cyber system-based response measures associated with "Buffer Overflow" in table 500A of FIG. 5A may include an MTD; a response to drop packets from SDN using DPI; a response to drop packets with unknown MAC/IP address at the SDN; and a response to startup secondary controller using the SDN. In addition, each mitigative response measure is associated with potential benefits and potential physical affects (e.g., "cyber mitigative benefit" and "physical mitigative benefit"). As indicated, multiple types of cyber system-based mitigative benefits and/or physical system-based mitigative benefits may be considered in association with each mitigative response measure. For example, the (possible) cyber mitigative benefits associated with "buffer overflow" in table 500A of FIG. 5A may include a benefit to prevent targeting of the end device; a benefit to drop packets of death before affecting the controller; a benefit to drop packets of unknown senders; and a benefit to continue service after starting up a second controller.

As is apparent, the breakdown in tables 500A, 500B, and 500C reveals a more generic approach to considerations that may be helpful for a trade-off analysis, and may preface the implementation of an automated and autonomous response. Different mitigative response measure approaches may be applied to an individual network and considered as part of the design process. Again, tables 500A, 500B, and 500C include non-exhaustive, non-limiting examples for use as one (example) starting list of possible response measures. Although a trade-off analysis provides the basis for evaluating the risk versus benefits, the analysis may also consider the communications design and the benefits as well as limitations. The taxonomies provided in the prior section provide a consideration of the normal cyber and physical related parameter exchanges occurring over the communications system, requiring consideration in developing a secure foundation for a communications system.

Figure 6:
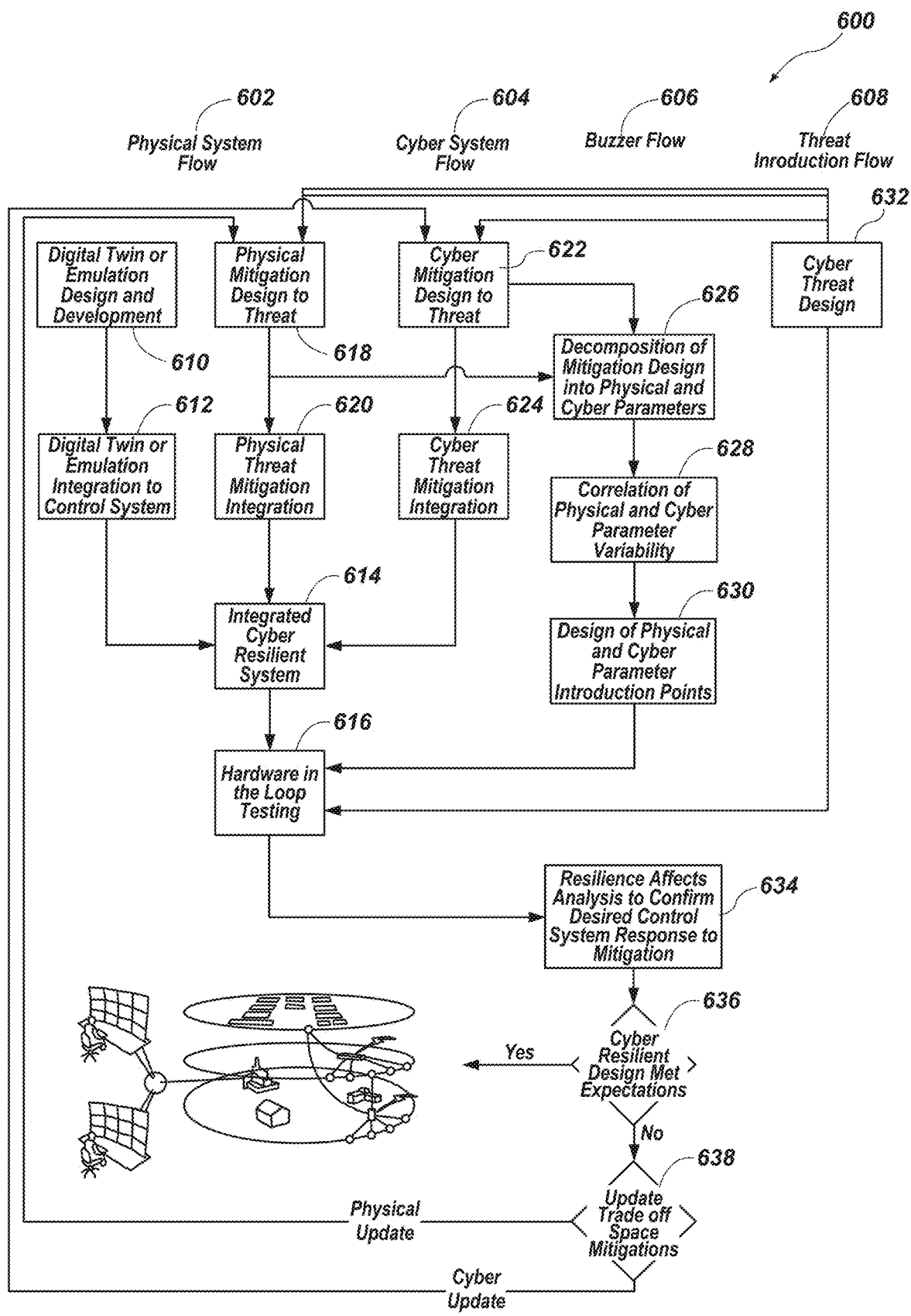
FIG. 6 is a process flow diagram of a process for implementing a cyber resilient trade-off analysis system for identifying one or more optimal mitigative response measures to anticipated cyber attacks, according to one or more examples.

FIG. 6 is a process flow diagram 600 of a process for implementing a cyber resilient trade-off analysis system for identifying one or more optimal mitigative response measure measures to anticipated cyber attacks, according to one or more examples.

In a physical system flow 602, a process 610 for designing and developing a digital twin or emulation of a physical system is performed. A process 612 for integrating the digital twin or emulation in a control system is also performed.

A trade-off analysis should begin with a design that considers cyber threats and suitable mitigative response measures, such as those detailed in FIGS. 5A, 5B, and 5C in one or more examples. In a threat introduction flow 608, a process 632 for designing one or more cyber threats (e.g., one or more simulated cyber threats) to the system is performed. Given the design of the one or more cyber threats in process 632, a set of suggested or proposed mitigative response measures to a given cyber threat is obtained. Input may be requested from a team of one or more experts including an OT engineer, a cybersecurity engineer/scientist, and/or a domain engineer. A suggested or proposed mitigative response measure to a cyber threat may include one or more physical mitigative response measures, one or more cyber mitigative response measures, or both.

In the physical system flow 602, a process 618 for designing or otherwise identifying one or more physical mitigative response measures (e.g., including components of such response) to the cyber threat is performed. The one or more physical mitigative response measures may be designed or identified at least in part based on the cyber threat design from process 632. A process 620 for integrating the design of the one or more physical mitigative response measures (e.g., including components of such response) into the system is also performed.

In a cyber system flow 604, a process 622 for designing or otherwise identifying one or more cyber mitigative response measures (e.g., including components of such response) to the cyber threat is performed. The one or more cyber mitigative response measures may be designed or identified at least in part based on the cyber threat design from process 632. A process 624 of integrating the design of the one or more cyber mitigative response measures (e.g., including components of such response) into the system is also performed.

In one or more examples, the design of the overall mitigative response measure including the one or more physical mitigative response measures in process 618 and/or the one or more cyber mitigative response measures in process 622 may be performed separately or in combination.

In a process 614, an integrated cyber resilient system is built and/or configured with the digital twin (provided via processes 610 and 612), the one or more physical mitigative response measures (provided via processes 618 and 620), and/or the one or more cyber mitigative response measures (provided via processes 622 and 624).

In a buzzer processing flow 606, a process 626 for decomposing the designed mitigative response measure into physical system and cyber system parameters is performed. A process 628 for correlating physical and cyber parameter variability is performed. A process 630 for designing physical and cyber parameter introduction points is also performed.

In a process 616, proper operation (e.g., resilient operation) of the integrated cyber resilient system is tested and/or confirmed with use of hardware-in-the-loop (HIL) testing. The parameters in the buzzer flow 606 and the design of the cyber threat from process 632 may be utilized in the HIL testing. A process 634 for analyzing resilience affects to confirm a desired control system response to the mitigative response measure is also performed.

If the cyber resilient design meets expectations as tested in a process 636 ("Yes"), then the cyber resilient design may be recommended and/or implemented for use in an OT system having the physical system. If the cyber resilient design fails to meet the expectations as tested in process 636 ("No"), then the cyber resilient design may not be recommended nor implemented for use in the OT system having the physical system. Rather, a process 638 for updating the trade-off space in the mitigative response measure design may be performed. The updates may include physical system updates associated with process 618 of the physical system flow 602, and/or cyber system updates associated with process 622 in the cyber system flow 604.

In one or more examples, the physical OT and emulated plant, the potential threats, the cyber and physical system-based mitigations, and the buzzer analysis process are all taken into consideration in an evaluation. The challenges in providing a relevant trade-off analysis are based upon emulation or digital twin fidelity, relevant representation of the hardware implementations of the OT system, scalability of an identified threat set, and other factors. Metrics of resilience should first consider the physical system resilience and evaluate how a particular cyber attack would lead to a particular result. For example, a Denial-of-Service (DoS) attack may lead to a delay in communications that may cause control algorithms to base decisions on old data and yield instabilities in physical process responses.

Development and use of a digital twin provides an opportunity to perform tradeoff analysis through systemic testing without concerns for physical impact, and also provides the basis for HIL validation. The development and use of the digital twin generally involves the integration of the emulation into the automation, logic, or process controller. Such emulations may come from different vendors and are specific to the domain, but ultimately may interface to the user-created control logic running on the same hardware as it would exist in the operating plant (e.g., power system, chemical plant, etc.). In this way, injection of mitigative response measures will better reflect hardware specific characteristics as would be seen in the plant. Leveraging a digital twin (e.g., plant emulation to measure reaction and impact) and existing tools (e.g., SDN as part of a mitigative response) allows for a simplified evaluation for the purpose of reducing the negative impact and the time to perform mitigation (e.g., recovery) in response to a cyber attack.

Based upon the trade-off design, the individual decomposition of responses may be considered in the design of the buzzer processing module, which injects mitigative response measures for a variety of cyber attack sequences. Together with a defined process for trade-off evaluation, the buzzer processing module may assist in revealing or confirming expected plant behavior for each cyber system-based response measure and physical system-based response measure, in order to provide an optimal design with the desired resilience and threat-resilient control system. In one or more examples, the buzzer processing module may perform a comparative analysis such that the desired resilience is maximized and system impact is minimized.

The resulting implementation of an automated and autonomous response may be built upon the secure foundation designed in the communications system. However, the confirmation of the appropriateness of these cyber-physical responses may be further validated. In addition, validations to consider the breadth of potential responses may further provide an understanding of the sensitivity of the system to particular changes.

Figure 7:
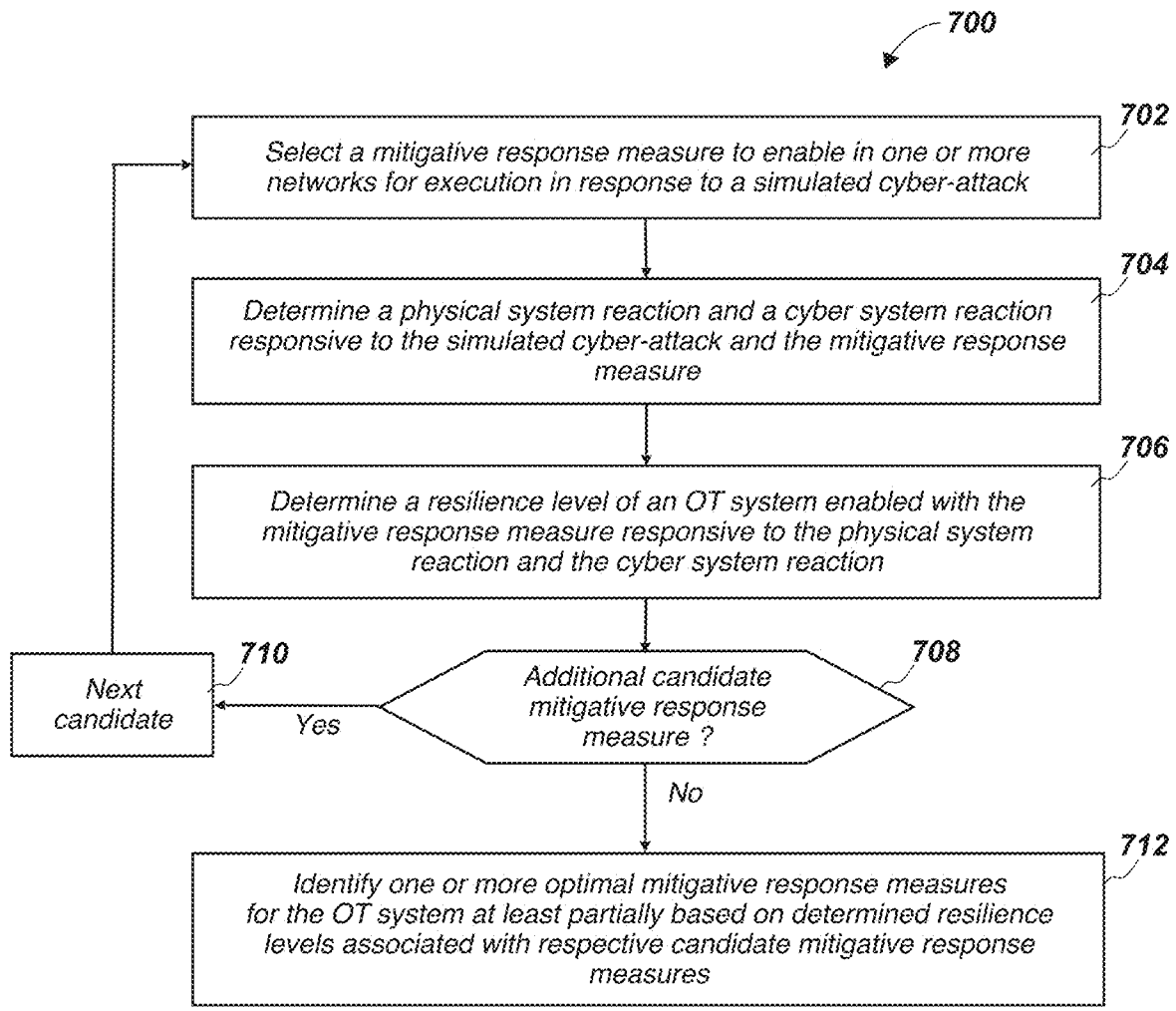
FIG. 7 is a flowchart for describing a method of identifying one or more optimal mitigative response measures to an anticipated cyber attack on an OT system, according to one or more examples.

FIG. 7 is a flowchart 700 for describing a method of identifying one or more optimal mitigative response measures to an anticipated cyber attack on an OT system, according to one or more examples. In one or more examples, the method may be performed in a system comprising one or more networks including a digital twin and one or more cyber system components, where the digital twin is configured to emulate at least a portion of a physical system of the OT system.

In the method of FIG. 7, one or more processors of the system may select a mitigative response measure to enable in the one or more networks for execution in response to a simulated cyber attack (step 702 of FIG. 7). The one or more processors may determine a physical system reaction and a cyber system reaction responsive to the simulated cyber attack and the mitigative response measure (step 704 of FIG. 7). The one or more processors may determine a resilience level of an OT system configured with the mitigative response measure responsive to the physical system reaction and the cyber system reaction (step 706 of FIG. 7). In one or more examples, the mitigative response measure may be determined to be satisfactory or acceptable for the OT system at least partially based on identifying that the determined resilience level is above a resilience threshold.

In one or more examples, the mitigative response measure may be one of a plurality of candidate mitigative response measures. If there are one or more additional candidate mitigative response measures to consider (as tested in step 708 of FIG. 7), the processing continues through step 710 ("next candidate"), where the one or more processors again select (step 702), determine (step 704), and determine (step 706) for respective next ones of the candidate mitigative responses. After consideration of many, most, or all candidate mitigative response measures (again as tested in step 708 of FIG. 7), the one or more processors may identify one or more optimal mitigative response measures for the OT system at least partially based on determined resilience levels associated with respective candidate mitigative response measures (step 712 of FIG. 7). In one or more examples, candidate mitigative response measures are determined to be satisfactory, acceptable, or optimal for the OT system at least partially based on identifying that the resilience levels are above a resilience threshold.

In one or more examples, respective ones of the candidate mitigative response measures include one or more cyber system-based mitigative response measures, one or more physical system-based mitigative response measures, or both.

In one or more examples, the one or more processors may determine an impact level on the OT system configured with the mitigative response measure responsive to the physical system reaction and the cyber system reaction; and select, as one or more optimal mitigative response measures, one or more candidate mitigative response measures associated with resilience levels that are above a resilience threshold and impact levels that are below an impact threshold.

In one or more examples, the one or more processors may be configured for identifying one or more optimal mitigative response measures for the OT system at least partially based on a genetics or evolutionary based algorithm. More specifically, the one or more processors may be configured to perform genetics or evolutionary based processing (in whole or in part) as shown described in relation to FIG. 9 and/or FIGS. 10A-10B.

Figure 8:
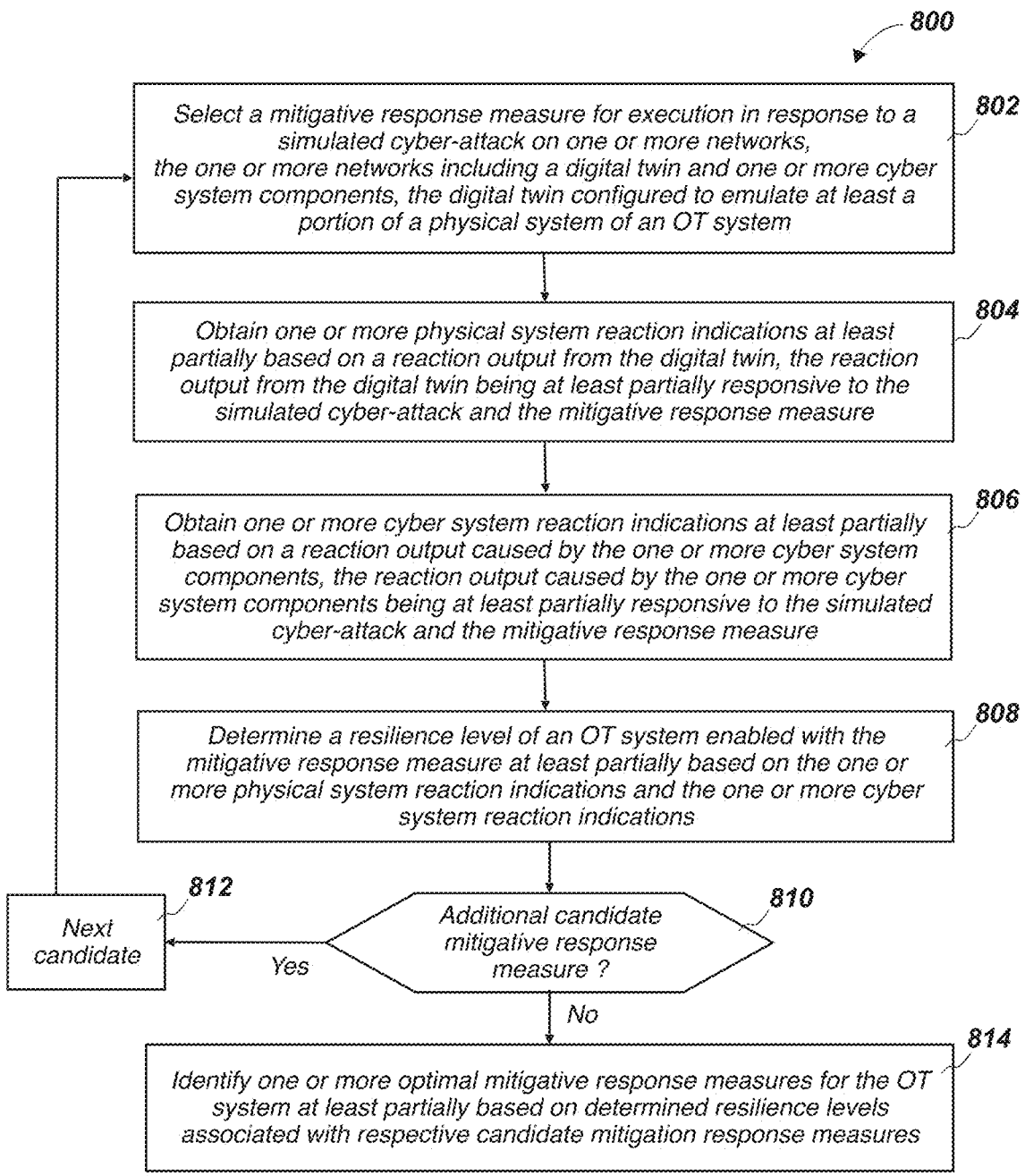
FIG. 8 is a flowchart for describing a method of identifying one or more optimal mitigative response measures to an anticipated cyber attack on an OT system, according to one or more examples.

FIG. 8 is a flowchart 800 for describing a method of identifying one or more optimal mitigative response measures to an anticipated cyber attack on an OT system, according to one or more examples. In one or more examples, the method may be embodied in a computer program product including at least one non-transitory computer-readable medium comprising computer-executable instructions, which when executed by one or more processors, cause the one or more processors to perform operations in accordance with the method.

A mitigative response measure for execution in response to a simulated cyber attack in one or more networks is selected (step 802 of FIG. 8). In one or more examples, the one or more networks configured with the mitigative response measure include a digital twin and one or more cyber system components, where the digital twin is configured to emulate at least a portion of a physical system of the OT system. One or more physical system reaction indications are obtained at least partially based on a reaction output from the digital twin, where the reaction output is at least partially responsive to the simulated cyber attack and the mitigative response measure (step 804 of FIG. 8). One or more cyber system reaction indications are obtained at least partially based on a reaction output caused by the one or more cyber system components, where the reaction output is at least partially responsive to the simulated cyber attack and the mitigative response measure (step 806 of FIG. 8). A resilience level of an OT system configured with the mitigative response measure is determined at least partially based on the one or more physical system reaction indications and the one or more cyber system reaction indications (step 808 of FIG. 8). In one or more examples, the mitigative response measure may be determined to be satisfactory or acceptable for the OT system at least partially based on identifying that the resilience level is above a resilience threshold.

In one or more examples, the mitigative response measure may be one of a plurality of candidate mitigative response measures. If there are one or more additional candidate mitigative response measures to consider (as tested in step 810 of FIG. 8), the method is continued through step 812 ("next candidate") to repeat the test procedure, that is, the selecting (step 802), the obtaining (step 804), the obtaining (step 806), and the determining (step 808) for respective next ones of the candidate mitigative response measures. After consideration of many, most, or all candidate mitigative response measures (again as tested in step 810 of FIG. 8), one or more optimal mitigative response measures for the OT system are identified at least partially based on determined resilience levels associated with respective candidate mitigative response measures (step 814 of FIG. 8). In one or more examples, candidate mitigative response measures are determined to be satisfactory, acceptable, or optimal for the OT system at least partially based on identifying that the resilience levels are above a resilience threshold. In one or more examples, an indication to recommend the one or more optimal mitigative response measures for the OT system is provided.

In one or more examples, an impact level on the OT system is determined at least partially based on the one or more physical system reaction indications and the one or more cyber system reaction indications; and one or more candidate mitigative response measures associated with resilience levels that are above a resilience threshold and impact levels that are below an impact threshold are selected as one or more optimal mitigative response measures.

In one or more examples, respective ones of the candidate mitigative response measures include one or more cyber system-based mitigative response measures, one or more physical system-based mitigative response measures, or both.

In one or more examples, the one or more physical system reaction indications are indicative of one or more of physical system reaction benefits, detriments, and costs of employing the mitigative response measure in the OT system, and the one or more cyber system reaction indications are indicative of one or more of cyber system reaction benefits, detriments, and costs of employing the mitigative response measure in the OT system.

In one or more examples, the method may be at least partially based on a genetics or evolutionary based algorithm. More specifically, the method may perform genetics or evolutionary based processing (in whole or in part) as shown described in relation to FIG. 9 and/or FIGS. 10A-10B. For example, respective ones of the candidate mitigative response measures may include a selected one or combination of multiple mitigative response components, and may further include, for respective ones of the multiple mitigative response components, a selected one of multiple configurations thereof, multiple settings thereof, and/or multiple parameters thereof. In one or more examples of the genetics or evolutionary based algorithm, the method may include selecting a subset of optimal candidate mitigative response measures at least partially based on a ranking of the respective ones of the candidate mitigative response measures from the test procedure, the ranking being at least partially based on determined resilience levels associated with the candidate mitigative response measures; generating an updated set of updated candidate mitigative response measures for a repeated test procedure based on at least some of the optimal candidate mitigative response measures, the updated set of updated candidate mitigative response measures including the at least some of the optimal candidate mitigative response measures adapted with modifications to and/or variations (e.g., crossover variants, mutations, and so on) on the respective selected ones or combinations of multiple mitigative response components and/or the respective selected ones of multiple configurations thereof, multiple settings thereof, and/or multiple parameters thereof; and repeating the test procedure for the updated set, the selecting of the subset of optimal candidate mitigative response measures, and the generating of the updated set of updated candidate mitigative response measures for the test procedure, one or more times as needed for identifying one or more optimal mitigative response measures for the OT system associated with the physical system.

Figure 9:
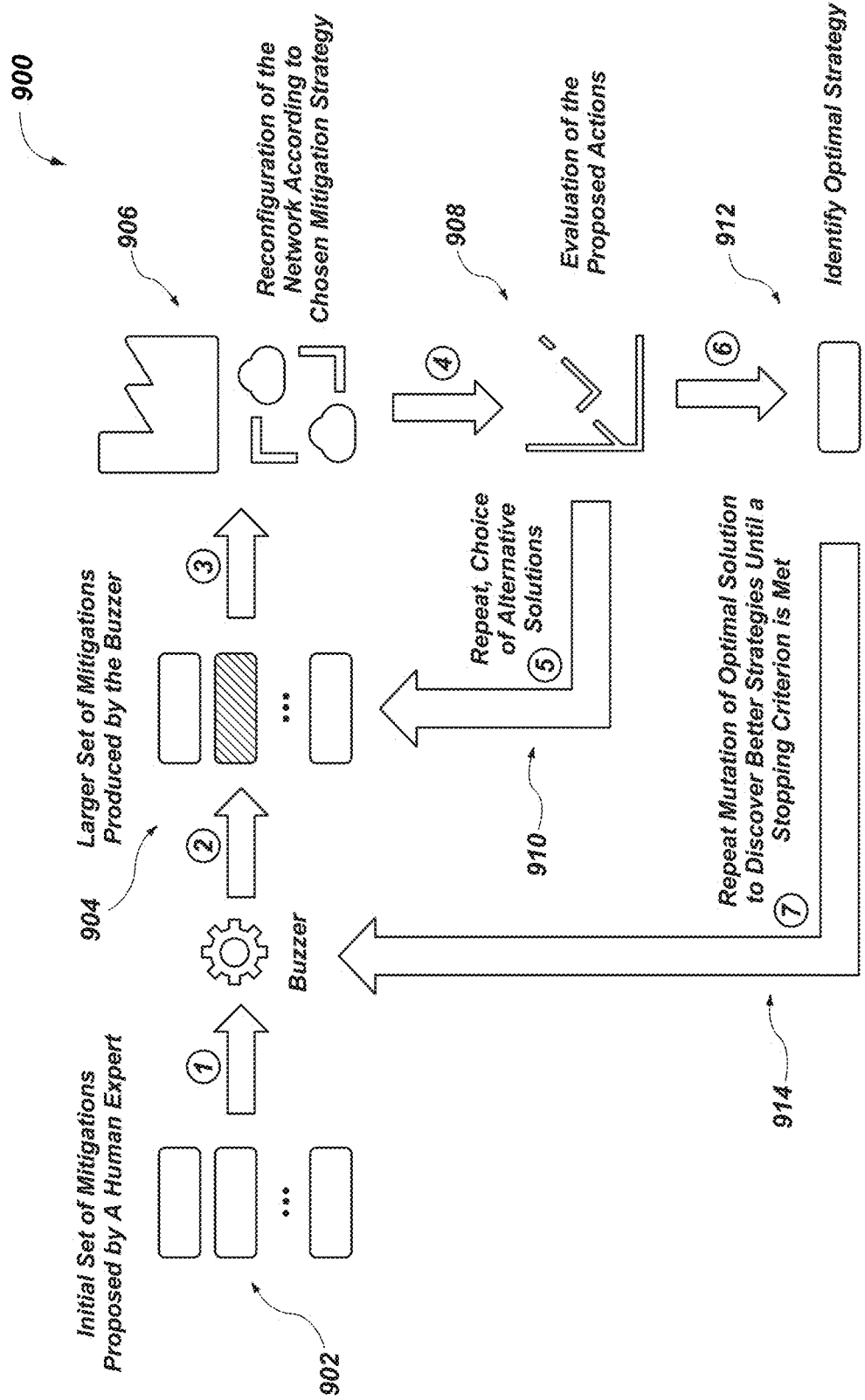
FIG. 9 is a process flow diagram of a process flow for identifying one or more optimal mitigative response measures to an anticipated cyber attack on an OT system using a buzzer or buzzer processing module, according to one or more examples.

FIG. 9 is a process flow diagram 900 of a process flow for identifying one or more optimal mitigative response measures to an anticipated cyber attack on an OT system using a "buzzer" or buzzer processing module, according to one or more examples. In one or more examples, the process flow of FIG. 9 may be based on a genetics or evolutionary based algorithm.

At an operation 902 of FIG. 9, an initial set of candidate mitigative response measures to a cyber attack may be proposed by one or more human experts. In one or more examples, each candidate mitigative response measure may include a selected one or combination of multiple mitigative response components, and may further include, for each one the multiple mitigative response components, a selected one of multiple configurations thereof, multiple settings thereof, and/or multiple parameters thereof.

The initial set of candidate mitigative response measures may be introduced to the buzzer processing module. At an operation 904, a larger set of candidate mitigative response measures may be produced by the buzzer processing module. In one or more examples, the larger set of updated candidate mitigative response measures may be produced to include the candidate mitigative response measures adapted with modifications to and/or variations on the respective selected ones or combinations of multiple mitigative response components, and/or the respective selected ones of multiple configurations thereof, multiple settings thereof, and/or multiple parameters thereof.

At an operation 906, a network is configured according to a selected mitigation strategy from the set, and at an operation 908, evaluation of the reaction of the network responsive to a simulated cyber attack is made. In each evaluation of operation 908, a resilience level may be determined for the candidate mitigative response measure (and, as examples, analyzed, ranked, selected, and so on, in relation to one or more resilience threshold(s)). At an operation 910, the process flow may repeat operations 906 and 908 for each next candidate mitigative response measure from the set.

At operation 912, a set of optimal mitigative response strategies may be identified. The set of optimal mitigative response strategies may be a subset of candidate mitigative response measures that are selected at least partially based on a ranking made according to determined resilience levels (e.g., include those above 80%). The remaining candidate mitigative response measures may be discarded (e.g., exclude those below 80%).

At operation 914, the process flow may repeat again at operation 904. At the repeated operation 914, a larger set of updated candidate mitigative response measures is (again) produced to include at least some of the optimal candidate mitigative response measures adapted with modifications to and/or variations on the respective selected ones or combinations of multiple mitigative response components, and/or the respective selected ones of multiple configurations thereof, multiple settings thereof, and/or multiple parameters thereof. Operations 904, 906, 908, 910, and 912 may be repeated one or more times for refinement and discovery of more optimal solutions for maintaining an adequate or optimal level of resiliency.

Figure 10A:
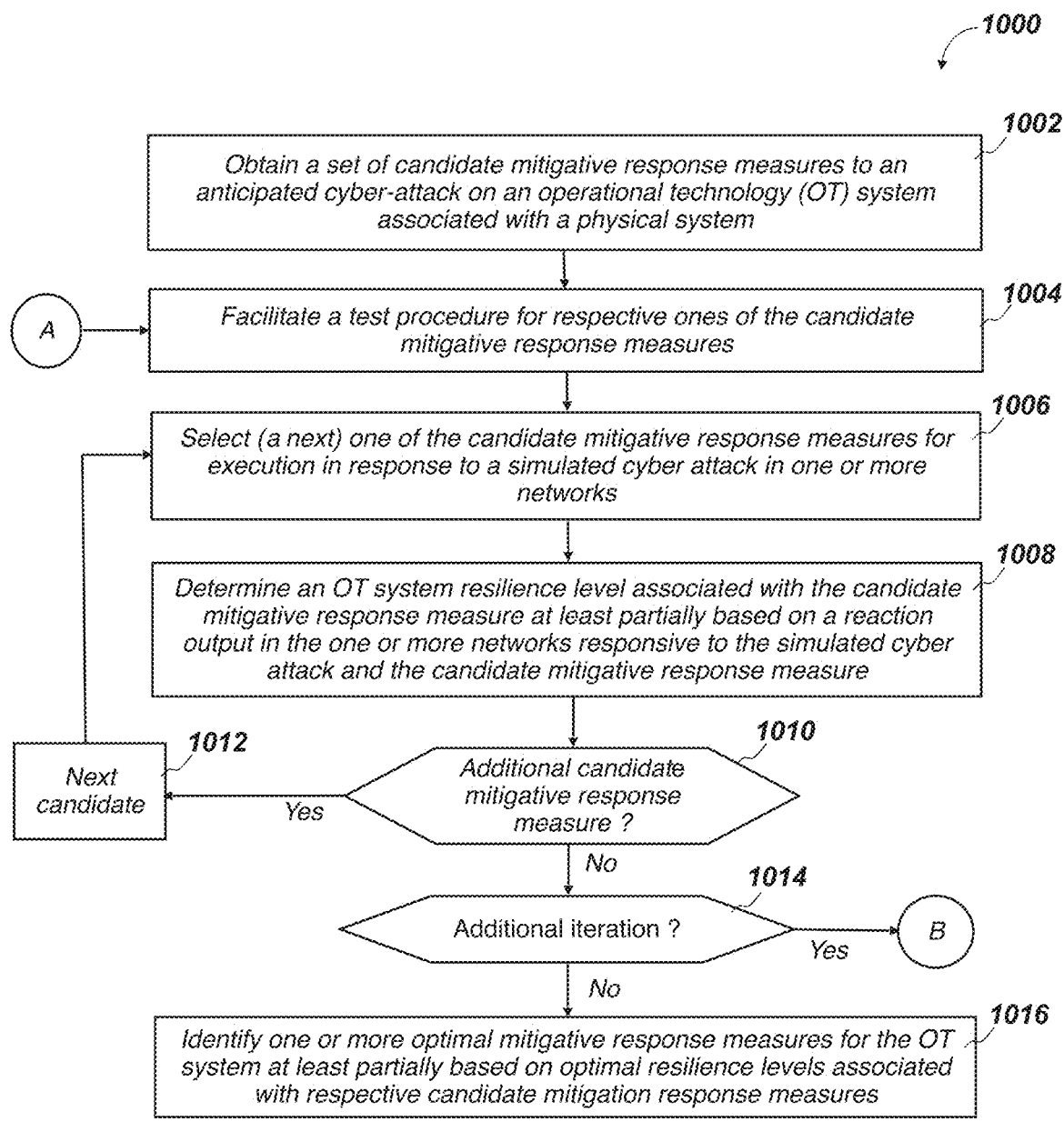
FIGS. 10A and 10B form a flowchart for describing a method of identifying one or more optimal mitigative response measures to an anticipated cyber attack on an OT system, using a buzzer or buzzer processing module, according to one or more examples.
Figure 10B:
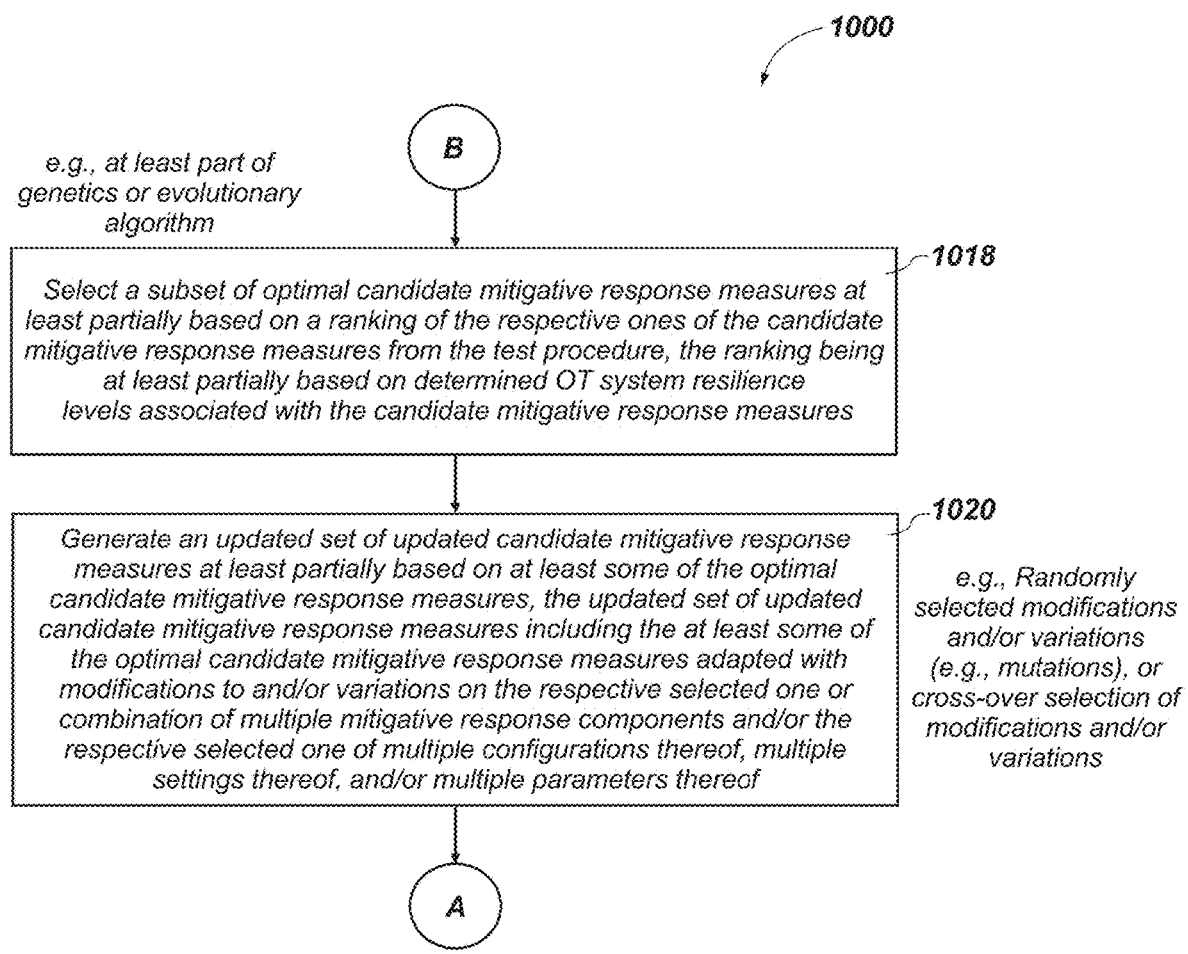

FIGS. 10A and 10B form a flowchart 1000 for describing a method of identifying one or more optimal mitigative response measures to an anticipated cyber attack on an OT system using one or more networks, according to one or more examples. In one or more examples, the method of FIGS. 10A-10B makes use of a "buzzer" or buzzer processing module. More particularly, in one or more examples, the method of FIGS. 10A-10B is for identifying one or more optimal mitigative response measures for the OT system at least partially based on a genetics or evolutionary based algorithm.

In one or more examples, the method of FIGS. 10A-10B may be embodied in a computer program product including at least one non-transitory computer-readable medium comprising computer-executable instructions, which when executed by one or more processors, cause the one or more processors to perform operations in accordance with the method. In one or more examples, the one or more networks include a digital twin configured to emulate at least a portion of the physical system of the OT system.

In FIG. 10A, a set of candidate mitigative response measures to an anticipated cyber attack on an OT system associated with a physical system is obtained (step 1002 of FIG. 10A). In one or more examples of step 1002, the obtaining of the set of candidate mitigative response measures comprises receiving, via an HMI or the like, the set of candidate mitigative response measures from one or more experts (an OT engineer, a cybersecurity engineer/scientist, and/or a domain engineer). A test procedure is facilitated for respective ones of the candidate mitigative response measures (step 1004 of FIG. 10A). The test procedure involves selecting a respective one of the candidate mitigative response measures for execution in response to a simulated cyber attack in one or more networks (step 1006 of FIG. 10A), and determining an OT system resilience level associated with the candidate mitigative response measure at least partially based on a reaction output in the one or more networks responsive to the simulated cyber attack and the candidate mitigative response measure (step 1008 of FIG. 10A).

If there are one or more additional mitigative response measures to consider (as tested in step 1010 of FIG. 10A), the method is continued through step 1012 ("next candidate") to repeat the test procedure, that is, the selecting (step 1006) and the determining (step 1008) for respective next ones of the candidate mitigative response measures. After consideration of many, most, or all candidate mitigative response measures (again as tested in step 1010 of FIG. 10A), it is tested whether there are one or more additional iterations to perform (step 1014 of FIG. 10A). If "yes" in step 1014, the method is continued through a connector B to FIG. 10B.

Continuing through connector B to FIG. 10B, in one or more examples, the method is at least partially based on a genetics or evolutionary based algorithm. Here, in one or more examples, respective ones of the candidate mitigative response measures include a selected one or combination of multiple mitigative response components, and further include, for respective ones of the multiple mitigative response components, a selected one of multiple configurations thereof, multiple settings thereof, and/or multiple parameters thereof. With reference to FIG. 10B, in one or more examples of the genetics or evolutionary based algorithm, a subset of optimal candidate mitigative response measures is selected at least partially based on a ranking of respective ones of the candidate mitigative response measures from the test procedure, the ranking being at least partially based on determined resilience levels associated with the candidate mitigative response measures (step 1018 of FIG. 10B). An updated set of updated candidate mitigative response measures is then generated based on at least some of the optimal candidate mitigative response measures of the subset (step 1020 of FIG. 10B). The updated set of updated candidate mitigative response measures includes the at least some of the optimal candidate mitigative response measures adapted with modifications to and/or variations on the respective selected ones or combinations of multiple mitigative response components, and/or the respective selected ones of multiple configurations thereof, multiple settings thereof, and/or multiple parameters thereof.

Through a connector A back to FIG. 10A, the steps of the method may repeat the test procedure for the updated set (steps 1004, 1006, 1008, and 1010 of FIG. 10A), repeat step 1014 ("Yes") through connector B back to FIG. 10B, and repeat the selecting of the subset of optimal candidate mitigative response measures (step 1018 of FIG. 10B) and the generating of the updated set of updated candidate mitigative response measures (step 1020 of FIG. 10B). The method may repeated in this manner one or more times as needed. When there are no more iterations to perform in step 1014 of FIG. 10A, or "No" in step 1014, one or more optimal mitigative response measures for the OT system may be identified at least partially based on determined OT system resilience levels associated with respective candidate mitigative response measures (step 1016 of FIG. 10A).

In one or more examples of step 1020 of FIG. 10B, the generating of the updated set of updated candidate mitigative response measures for the repeated test procedure may involve performing a crossover operation in selecting the modifications and/or the variations (e.g., generating crossover variants, and so on). In one or more examples of step 1020 of FIG. 10B, the generating of the updated set of updated candidate mitigative response measures for the repeated test procedure may involve randomly selecting the modifications and/or the variations (e.g., generating mutations, and so on).

As is apparent, the present disclosure provides a foundation for performing a tradeoff analysis based on factors relating to mitigation response, benefit, and impact within an OT system. The analysis process may be a notable step towards establishing an informed acceptance and adoption of technologies that achieve cyber resilience. Also, a recognition of the taxonomy of the cyber and physical parameter interfaces may provide a better understanding of expected and relevant communications traffic for an OT system. Enhancement of OT design tools with the consideration of communications may inform an OT designer of the trade-off risk that is based upon these taxonomies. Such an understanding may be helpful to assist OT asset owners to appropriately accept configurations of recommended mitigative response measures, including cybersecurity methods such as network segmentation (e.g., provided via SDN).

Figure 11:
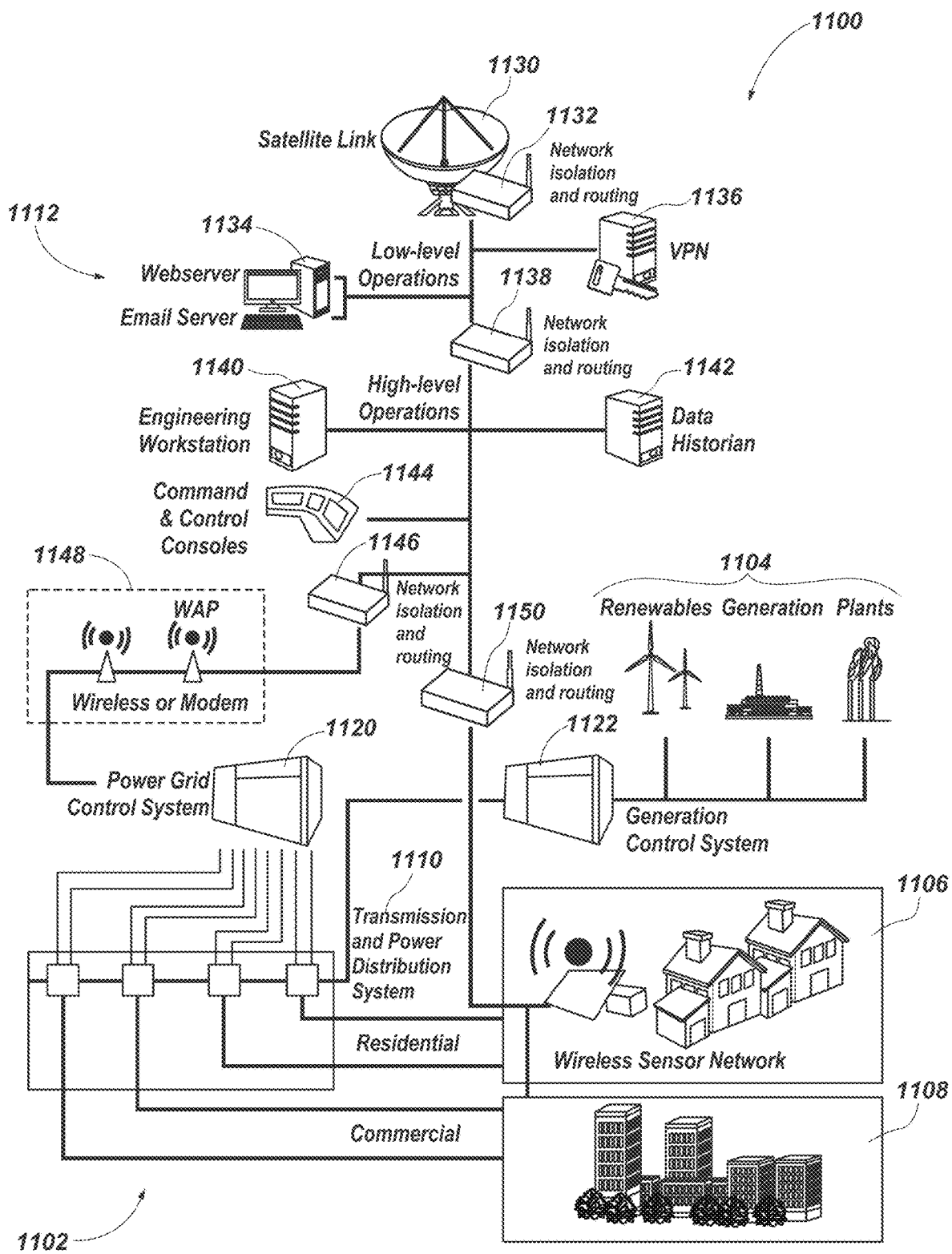
FIG. 11 is an illustrative diagram of a power grid infrastructure which may be part of an interconnected cyber-physical system, according to one or more examples.

FIG. 11 is an illustrative diagram of a power grid infrastructure 1100 which may be part of an interconnected cyber-physical system, according to one or more examples. The power grid infrastructure 1100 is one example use case of various examples disclosed herein. One or more energy sources 1104 (e.g., an electrical plant, a renewable energy source, and so on) are connected to a control system 1122 for the generation of electricity. The electricity may be distributed to one or more locations (e.g., a residential location 1106, a commercial location 1108, and so on) via a transmission and power distribution system 1110. Transmission and power distribution system 1110 includes a power grid 1102 and a control system 1120 for power grid 1102.

One or more networks 1112 are connected to the infrastructure to provide IT-OT integration in power grid infrastructure 1100. Communications may be received and transmitted via one or more networks 1112 through one or more routers 1132 using wired or wireless links (e.g., a satellite link via a satellite 1130). One or more routers 1132 are configured to provide appropriate network isolation and network routing for communications associated with one or more networks 1112. Low-level operations may be provided using one or more servers 1134 (e.g., a web server, an e-mail server, and so on) and one or more computer systems 1136 that provide one or more virtual private networks (VPNs). One or more routers 1138 are configured to provide further network isolation and network routing in one or more networks 1112. High-level operations may be provided using one or more engineering workstations 1140, one or more command and control consoles 1144, and one or more data historian servers 1142 that monitor and analyze data associated with the infrastructure and/or networks. One or more routers 1146 are configured to provide further network isolation and network routing associated with control system 1120 of power grid 1102 (e.g., via one or more access points 1148, which may be wireless APs or WAPs). One or more routers 1150 are configured to provide further network isolation and network routing for communications associated with networks (e.g., wireless sensor networks) of the one or more locations (e.g., residential location 1106).

As is apparent in FIG. 11, there may be many physical operations and network segments associated with the OT process. In one or more examples, there is a distributed nature in providing the response. Using one or more approaches as described in relation to FIGS. 4A and 4B, sensing and responses may not only optimally defined but optimally introduced within the network environment to achieve the most resilient response.

Figure 12:
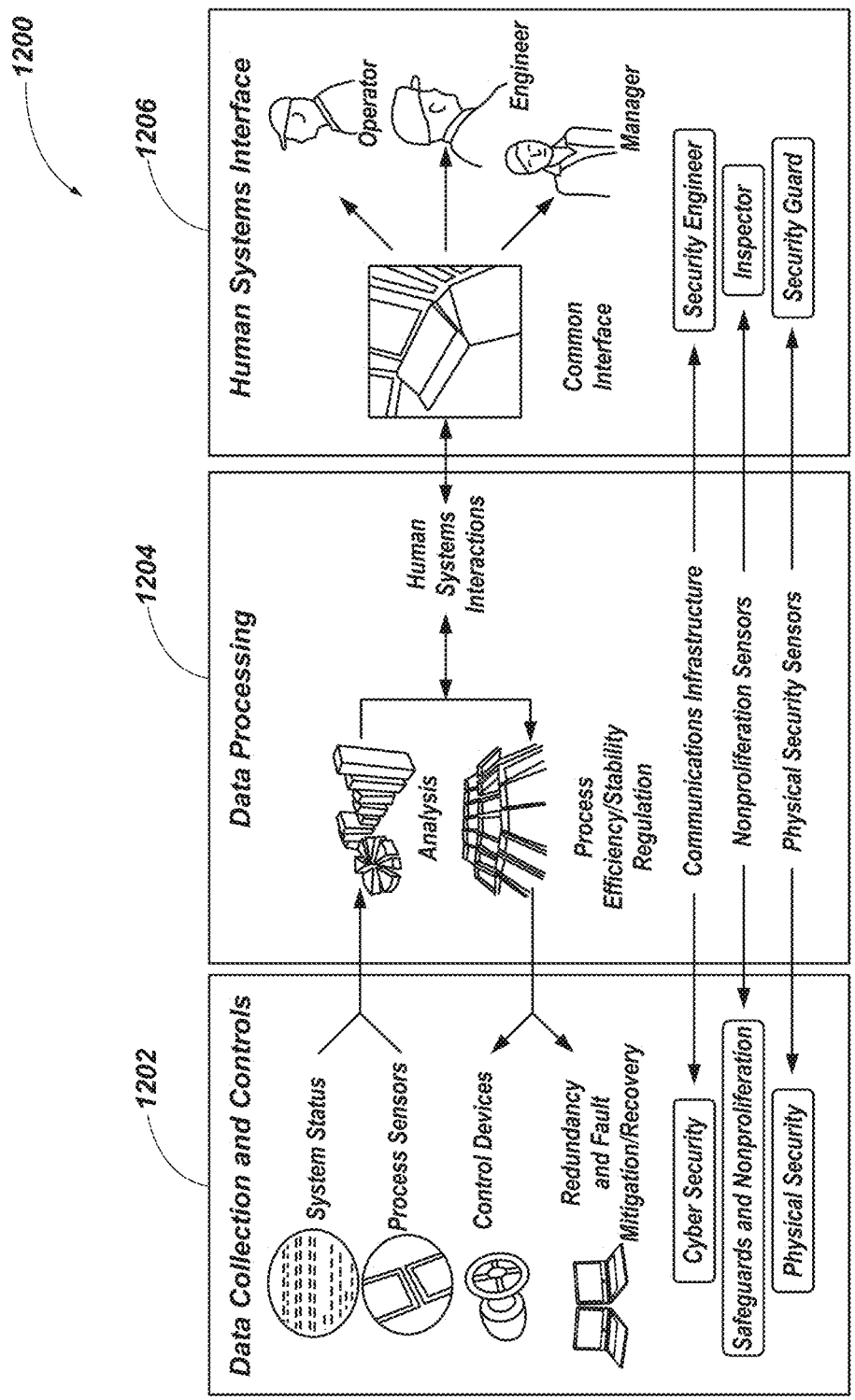
FIG. 12 is an illustrative diagram of a system configured with OT functionality, according to one or more examples.

FIG. 12 is an illustrative diagram of a system 1200 configured with OT functionality, according to one or more examples. System 1200 includes one or more components 1202 for data collection and control, one or more components 1204 for data processing, and one or more components 1206 for human systems interface, in one or more examples.

One or more components 1202 for data collection and control include system status components, process sensors, control devices, redundancy and fault mitigation/recovery components. One or more components 1202 for data collection and control also include cyber security components, safeguard and nonproliferation components, and physical security components.

One or more components 1204 for data processing include analysis components and process efficiency/stability regulation components. The analysis components may be operably coupled to the system status components and process sensors of the one or more components 1202 for data collection and control. The process efficiency/stability regulation components may be operably coupled to the control devices and the redundancy and fault mitigation/recovery components of the one or more components 1202 for data collection and control.

One or more components 1206 for human systems interface include one or more common interfaces to the one or more components 1204 for data processing to facilitate human systems interactions. The one or more components 1206 for human systems interface may facilitate human systems interactions with one or more users, such an operator, an engineer, a manager, and so on. For example, cyber security for the one or more components 1202 for data collection and control may be controlled by a security engineer via a communications infrastructure used by the one or more components 1204 for data processing. As another example, safeguards and nonproliferation for the one or more components 1202 for data collection and control may be controlled by an inspector with use of nonproliferation sensor signals obtained via the one or more components 1204 for data processing. As yet another example, physical security associated with the one or more components 1202 for data collection and control may be managed by a security guard with use of physical security sensor signals obtained via the one or more components 1204 for data processing.

In system 1200 configured with OT functionality, transport and network layer communications may be based upon transport control protocol (TCP), although Internet Protocol (IP) communications may alternatively or additional be used. Oftentimes, OT vendors include their own specific protocol application to establish deterministic behavior and proprietary device interface functionality. Network integration is typically achieved by maintaining these interfaces and functionality, but does not consider designs that accommodate new cybersecurity technology and/or other potential cyber-physical responses that could isolate or reroute communications as a mitigative response measure (e.g., SDN).

The taxonomy of data exchange and time provides a foundation for the application of various response technologies (e.g., SDN) to design for such considerations. The results may help users understand and minimize impacts to an OT system. However, leveraging OT design tools that provide a better understanding of data exchange and time may start with engineering workstations (EWS). Such design tools may provide a means to develop the plant control configuration, operator HMI, and other inter-node interactions. Enhancing these tools to consider and compile communications-related dependencies may inform of the taxonomy, and as a result, may further inform of any potential effects that may occur as a result of a cyber system-based response measure.

Enhancing these tools to provide the ability to confirm the disturbance or delay of traffic may provide a basis to plan for the interface that considers a mitigative action for a cyber attack. The result may include a cyber-informed tool that considers the communications boundaries that codify the parameters of greatest importance. HIL testing with high fidelity emulations may confirm the effectiveness of the responses without unexpected impact. Communications dependence may be instantiated and validated to confirm the benefit of the trade-off analysis in the OT design.

Figure 13:
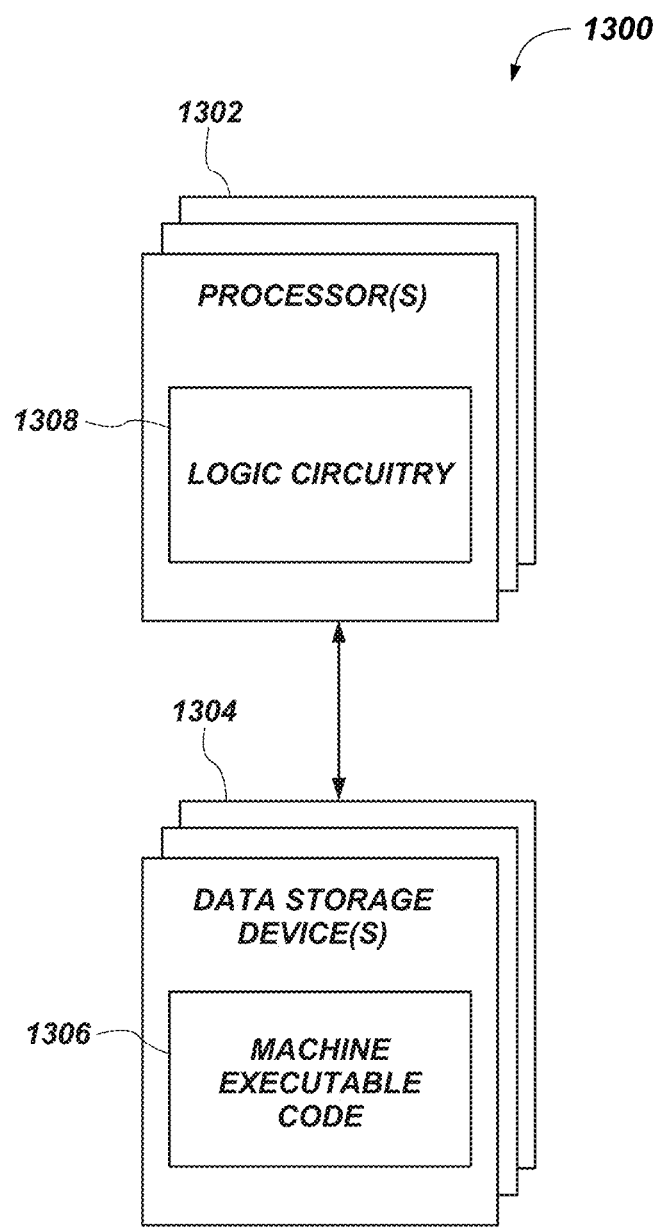
FIG. 13 is a block diagram of circuitry that, in one or more examples, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 13 illustrates non-limiting examples of implementations of functional elements disclosed herein. In some embodiments, some or all portions of the functional elements disclosed herein may be performed by hardware specially configured for carrying out the functional elements.

FIG. 13 is a block diagram of circuitry 1300 that, in some embodiments, may be used to implement various functions, operations, acts, processes, and/or methods disclosed herein. The circuitry 1300 includes one or more processors 1302 (sometimes referred to herein as "processors 1302") operably coupled to one or more data storage devices (sometimes referred to herein as "storage 1304"). The storage 1304 includes machine executable code 1306 stored thereon and the processors 1302 include logic circuitry 1308. The machine executable code 1306 includes information describing functional elements that may be implemented by (e.g., performed by) the logic circuitry 1308. The logic circuitry 1308 is adapted to implement (e.g., perform) the functional elements described by the machine executable code 1306. The circuitry 1300, when executing the functional elements described by the machine executable code 1306, should be considered as special purpose hardware configured for carrying out functional elements disclosed herein. In some embodiments the processors 1302 may be configured to perform the functional elements described by the machine executable code 1306 sequentially, concurrently (e.g., on one or more different hardware platforms), or in one or more parallel process streams.

When implemented by logic circuitry 1308 of the processors 1302, the machine executable code 1306 is configured to adapt the processors 1302 to perform operations of embodiments disclosed herein. For example, the machine executable code 1306 may be configured to adapt the processors 1302 to perform at least a portion, multiple portions, or all of the processing, the analyzing/evaluating, and/or the identifying in the one or more examples described herein (e.g., in relation to any one of flows, processes, and methods associated with FIGS. 4A, 4B, 6, 7, 8, 9 and 10A-10B). As another example, the machine executable code 1306 may be configured to adapt the processors 1302 to perform at least a portion, multiple portions, or all of the operations associated with the power grid infrastructure 1100 of FIG. 11 and OT functions and interfaces of FIG. 12.

The processors 1302 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein.

A general-purpose computer including a processor is considered a special-purpose computer while the general-purpose computer is configured to execute functional elements corresponding to the machine executable code 1306 (e.g., software code, firmware code, hardware descriptions) related to embodiments of the present disclosure. It is noted that a general-purpose processor (may also be referred to herein as a host processor or simply a host) may be a microprocessor, but in the alternative, the processors 1302 may include any conventional processor, controller, microcontroller, or state machine. The processors 1302 may also be implemented as a combination of computing devices, such as a combination of a DSP and a microprocessor, a plurality of microprocessors, one or more microprocessors in conjunction with a DSP core, or any other such configuration.

In some embodiments the storage 1304 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 1302 and the storage 1304 may be implemented into a single device (e.g., a semiconductor device product, a system on chip (SOC), etc.). In some embodiments the processors 1302 and the storage 1304 may be implemented into separate devices.

In some embodiments the machine executable code 1306 may include computer-readable instructions (e.g., software code, firmware code). By way of non-limiting example, the computer-readable instructions may be stored by the storage 1304, accessed directly by the processors 1302, and executed by the processors 1302 using at least the logic circuitry 1308. Also by way of non-limiting example, the computer-readable instructions may be stored on the storage 1304, transferred to a memory device (not shown) for execution, and executed by the processors 1302 using at least the logic circuitry 1308. Accordingly, in some embodiments the logic circuitry 1308 includes electrically configurable logic circuitry 1308.

In some embodiments the machine executable code 1306 may describe hardware (e.g., circuitry) to be implemented in the logic circuitry 1308 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1308 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 1306 may include an HDL, an RTL, a GL description, a mask level description, other hardware description, or any combination thereof.

In embodiments where the machine executable code 1306 includes a hardware description (at any level of abstraction), a system (not shown, but including the storage 1304) may be configured to implement the hardware description described by the machine executable code 1306. By way of non-limiting example, the processors 1302 may include a programmable logic device (e.g., an FPGA or a PLC) and the logic circuitry 1308 may be electrically controlled to implement circuitry corresponding to the hardware description into the logic circuitry 1308. Also by way of non-limiting example, the logic circuitry 1308 may include hard-wired logic manufactured by a manufacturing system (not shown, but including the storage 1304) according to the hardware description of the machine executable code 1306.

Regardless of whether the machine executable code 1306 includes computer-readable instructions or a hardware description, the logic circuitry 1308 is adapted to perform the functional elements described by the machine executable code 1306 when implementing the functional elements of the machine executable code 1306. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A system comprising:
one or more networks including a digital twin and one or more cyber system components, the digital twin configured to emulate at least a portion of a physical system of an operational technology (OT) system; and
one or more processors configured to perform operations to:
  select, from a set of candidate mitigative response measures, a candidate mitigative response measure to enable in the one or more networks for execution responsive to a simulated cyber attack;
  determine a physical system reaction and a cyber system reaction responsive to the simulated cyber attack and the selected candidate mitigative response measure;
  determine a resilience level for the OT system enabled with the selected candidate mitigative response measure responsive to the physical system reaction and the cyber system reaction; and
  repeat the operations to select the candidate mitigative response measure, to determine the physical system reaction and the cyber system reaction, and to determine the resilience level for the OT system, for respective next ones of candidate mitigative response measures of the set.

2. The system of claim 1, wherein the one or more processors are configured to:
after the repeating of the operations for the respective next ones of candidate mitigative response measures of the set, identify one or more optimal mitigative response measures for the OT system at least partially based on determined resilience levels associated with respective candidate mitigative response measures that are above one or more resilience thresholds.

3. The system of claim 1, wherein the one or more processors are configured to:
in the operations, determine an impact level on the OT system enabled with the selected candidate mitigative response measures responsive to the physical system reaction and the cyber system reaction; and
after the repeating of the operations for the respective next ones of candidate mitigative response measures of the set, select, as one or more optimal mitigative response measures, one or more candidate mitigative response measures associated with the determined resilience levels that are above a resilience threshold and the determined impact levels that are below an impact threshold.

4. The system of claim 1, wherein respective ones of the candidate mitigative response measures comprise one or more cyber system-based mitigative response measures, one or more physical system-based mitigative response measures, or both.

5. The system of claim 1, wherein respective ones of the candidate mitigative response measures include a selected one or combination of multiple mitigative response components, and further include, for respective ones of the selected one or the combination of the multiple mitigative response components, a selected one of multiple configurations thereof, multiple settings thereof, and/or multiple parameters thereof.

6. The system of claim 5, wherein the one or more processors are configured to:
select a subset of optimal candidate mitigative response measures at least partially based on a ranking of respective ones of the candidate mitigative response measures after the repeated operations, the ranking being at least partially based on determined resilience levels associated with the respective candidate mitigative response measures;
generate an updated set of updated candidate mitigative response measures based on at least some of the optimal candidate mitigative response measures of the subset, the updated set of updated candidate mitigative response measures including the at least some of the optimal candidate mitigative response measures adapted with modifications to and/or variations on the respective selected ones or combinations of the multiple mitigative response components and/or the selected respective ones of the multiple configurations thereof, the multiple settings thereof, and/or multiple parameters thereof; and
repeat the repeated operations for the updated set, the selecting of the subset of optimal candidate mitigative response measures, and the generating of the updated set of updated candidate mitigative response measures, one or more times as needed to identify one or more optimal mitigative response measures for the OT system, the one or more optimal mitigative response measures identified at least partially based on the determined resilience levels associated with respective candidate mitigative response measures that are above one or more resilience thresholds.

7. The system of claim 2, wherein the one or more processors are configured to identify the one or more optimal mitigative response measures for the OT system at least partially based on a genetics or evolutionary based algorithm.

8. A method of identifying one or more optimal mitigative response measures to an anticipated cyber attack on an operational technology (OT) system using one or more networks, the one or more networks including a digital twin and one or more cyber system components, the digital twin configured to emulate at least a portion of a physical system of the OT system, the method comprising:
selecting, from a set of candidate mitigative response measures, a candidate mitigative response measure for execution in response to a simulated cyber attack in the one or more networks;
obtaining one or more physical system reaction indications at least partially based on a reaction output from the digital twin, the reaction output from the digital twin being at least partially responsive to the simulated cyber attack and the selected candidate mitigative response measure;
obtaining one or more cyber system reaction indications at least partially based on a reaction output caused by the one or more cyber system components, the reaction output caused by the one or more cyber system components being at least partially responsive to the simulated cyber attack and the selected candidate mitigative response measure;
determining a resilience level of the OT system enabled with the mitigative response measure at least partially based on the one or more physical system reaction indications and the one or more cyber system reaction indications; and
repeating operations including the selecting of the candidate mitigative response measure, the obtaining of the one or more physical system reaction indications, the obtaining of the one or more cyber system reaction indications, and the determining of the resilience level of the OT system, for respective next ones of candidate mitigative response measures of the set.

9. The method of claim 8, further comprising:
after the repeating of the operations for the respective next ones of candidate mitigative response measures of the set, identifying the one or more optimal mitigative response measures for the OT system at least partially based on determined resilience levels associated with the respective candidate mitigative response measures that are above one or more resilience thresholds.

10. The method of claim 9, further comprising:
in the operations, determining an impact level on the OT system at least partially based on the one or more physical system reaction indications and the one or more cyber system reaction indications; and
after the repeating of the operations for the respective next ones of candidate mitigative response measures of the set, selecting, as the one or more optimal mitigative response measures, one or more candidate mitigative response measures associated with the determined resilience levels that are above a resilience threshold and determined impact levels that are below an impact threshold.

11. The method of claim 9, further comprising:
providing an indication to recommend the one or more optimal mitigative response measures for the OT system.

12. The method of claim 8, wherein respective ones of the candidate mitigative response measures comprise one or more cyber system-based mitigative response measures, one or more physical system-based mitigative response measures, or a combination thereof.

13. The method of claim 8, wherein:
the one or more physical system reaction indications are indicative of one or more of physical system reaction benefits, detriments, and costs of employing the selected candidate mitigative response measure in the OT system, and
the one or more cyber system reaction indications are indicative of one or more of cyber system reaction benefits, detriments, and costs of employing the selected candidate mitigative response measure in the OT system.

14. The method of claim 8, wherein respective ones of the candidate mitigative response measures include a selected one or combination of multiple mitigative response components, and further include, for respective ones of the selected one or the combination of the multiple mitigative response components, a selected one of multiple configurations thereof, multiple settings thereof, and/or multiple parameters thereof, the method further comprising:
selecting a subset of optimal candidate mitigative response measures at least partially based on a ranking of respective ones of the candidate mitigative response measures after the repeated operations, the ranking being at least partially based on determined resilience levels associated with the respective candidate mitigative response measures;
generating an updated set of updated candidate mitigative response measures based on at least some of the optimal candidate mitigative response measures of the subset, the updated set of updated candidate mitigative response measures including the optimal candidate mitigative response measures adapted with modifications to and/or variations on the respective selected ones or combinations of the multiple mitigative response components and/or the respective selected ones of the multiple configurations thereof, the multiple settings thereof, and/or the multiple parameters thereof; and
repeating the repeated operations for the updated set, the selecting of the subset of optimal candidate mitigative response measures, and the generating of the updated set of updated candidate mitigative response measures, one or more times as needed to identify one or more optimal mitigative response measures for the OT system associated with the physical system, the one or more optimal mitigative response measures identified at least partially based on the determined resilience levels associated with respective candidate mitigative response measures that are above one or more resilience thresholds.

15. The method of claim 9, wherein the method is at least partially based on a genetics or evolutionary based algorithm.

16. The method of claim 14, wherein the generating of the updated set of updated candidate mitigative response measures comprises:
performing a crossover operation in selecting the modifications and/or the variations.

17. The method of claim 14, wherein the generating of the updated set of updated candidate mitigative response measures comprises:
randomly selecting the modifications and/or the variations.

18. At least one non-transitory computer-readable medium comprising computer-executable instructions, which when executed by one or more processors, cause the one or more processors to perform operations comprising:
obtaining a set of candidate mitigative response measures to an anticipated cyber attack on an operational technology (OT) system associated with a physical system, respective ones of the candidate mitigative response measures indicating use of a selected one or combination of multiple mitigative response components, and further indicating use of, for respective ones of the selected one or the combination of the multiple mitigative response components, a selected one of multiple configurations thereof, multiple settings thereof, and/or multiple parameters thereof;
facilitating a procedure for respective ones of the candidate mitigative response measures of the set, the procedure comprising:
selecting a respective one of the candidate mitigative response measures for execution in response to a simulated cyber attack in one or more networks; and
determining a resilience level for the OT system enabled with the candidate mitigative response measure at least partially based on a reaction output in the one or more networks responsive to the simulated cyber attack and the selected candidate mitigative response measure;
selecting a subset of optimal candidate mitigative response measures at least partially based on a ranking of the respective ones of the candidate mitigative response measures from the procedure, the ranking being at least partially based on determined resilience levels associated with the respective candidate mitigative response measures;
generating an updated set of updated candidate mitigative response measures based on at least some of the optimal candidate mitigative response measures of the subset, the updated set of updated candidate mitigative response measures including the at least some of the optimal candidate mitigative response measures adapted with modifications to and/or variations on the respective selected ones or combinations of the multiple mitigative response components and/or the respective selected ones of the multiple configurations thereof, the multiple settings thereof, and/or the multiple parameters thereof; and
repeating the facilitating of the procedure for the updated set, the selecting of the subset of optimal candidate mitigative response measures, and the generating of the updated set, one or more times as needed to identify one or more optimal mitigative response measures for the OT system, the one or more optimal mitigative response measures identified at least partially based on the determined resilience levels associated with respective candidate mitigative response measures that are above one or more resilience thresholds.

19. The computer-readable medium of claim 18, wherein the one or more networks include a digital twin configured to emulate at least a portion of the physical system of the OT system.

20. The computer-readable medium of claim 18, wherein the operations are performed at least partially based on a genetics or evolutionary based algorithm.

21. The computer-readable medium of claim 20, wherein the operations for the generating of the updated candidate mitigative response measures comprise:
   performing a crossover operation in selecting the modifications and/or the variations.

22. The computer-readable medium of claim 20, wherein the operations for the generating of the updated set of updated candidate mitigative response measures comprise:
   randomly selecting the modifications and/or the variations.

23. The computer-readable medium of claim 18, wherein the operations for the obtaining of the set of candidate mitigative response measures comprises:
   receiving, via a human machine interface (HMI), the set of candidate mitigative response measures from one or more experts.

* * * * *